United States Patent
Lee et al.

(10) Patent No.: US 10,726,193 B2
(45) Date of Patent: Jul. 28, 2020

(54) ELECTRONIC DEVICE AND OPERATING METHOD THEREOF

(71) Applicant: Samsung Electronics Co., Ltd, Suwon-si (KR)

(72) Inventors: Ho Young Lee, Seoul (KR); Kayeon Kim, Seoul (KR); Bokeun Kim, Suwon-si (KR); Kyuho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/890,317

(22) Filed: Feb. 6, 2018

(65) Prior Publication Data

US 2018/0225261 A1    Aug. 9, 2018

(30) Foreign Application Priority Data

Feb. 6, 2017    (KR) ........................ 10-2017-0016437

(51) Int. Cl.
```
G06F 40/103      (2020.01)
G06F 3/0484      (2013.01)
G06T 13/80       (2011.01)
H04N 1/00        (2006.01)
```

(52) U.S. Cl.
CPC ........ G06F 40/103 (2020.01); G06F 3/04845 (2013.01); G06T 13/80 (2013.01); H04N 1/00458 (2013.01)

(58) Field of Classification Search
CPC .... G06F 17/211; G06F 3/04845; G06T 13/80; H04N 1/00458
See application file for complete search history.

(56) References Cited

U.S. PATENT DOCUMENTS

| | | | |
|---|---|---|---|
| 6,366,286 B1 * | 4/2002 | Hermanson | H04N 5/272 345/473 |
| 8,694,889 B2 * | 4/2014 | Tilton | G06T 13/80 715/732 |
| 8,832,555 B2 | 9/2014 | Weber et al. | |
| 9,047,255 B2 | 6/2015 | Weber et al. | |
| 2007/0074115 A1 * | 3/2007 | Patten | G11B 27/032 715/716 |
| 2012/0198338 A1 * | 8/2012 | Flint | G11B 27/034 715/726 |
| 2013/0124951 A1 * | 5/2013 | Shechtman | G06T 13/80 715/201 |
| 2015/0113370 A1 * | 4/2015 | Flider | G06F 17/211 715/204 |

* cited by examiner

Primary Examiner — Andrew T Chiusano

(57) ABSTRACT

Various embodiments of the present disclosure relate to a device and a method for providing differentiated transition effects based on the attributes of an object recognized in next contents when a screen switches in an electronic device. According to various embodiments of the present disclosure, an electronic device includes a display; a memory; and a processor configured to be operably coupled to the display and the memory, wherein the processor is configured to: display first contents; analyze the attributes of second contents to be displayed subsequent to the first contents while displaying the first contents; determine a transition effect corresponding to the attributes of the second contents; determine to switch a screen from the first contents to the second contents; and display the second contents using the determined transition effect based on the determination of screen transition.

20 Claims, 26 Drawing Sheets

ELECTRONIC DEVICE AND OPERATING METHOD THEREOF

CROSS-REFERENCE TO RELATED APPLICATION

This application is related to and claims the benefit of Korean Patent Application No. 10-2017-0016437 filed on Feb. 6, 2017, the contents of which are incorporated herein by reference.

TECHNICAL FIELD

Various embodiments of the present disclosure relate to a device and a method for adaptively providing various transition effects when a screen switches in an electronic device.

BACKGROUND

Recently, since the development of digital technology, various types of electronic devices, such as mobile communication terminals, smart phones, tablets, personal computers, notebooks, personal digital assistants (PDAs), wearable devices, digital cameras, personal computers, or the like are widely used.

Users may browse images using the electronic device while the images switch in sequence according to a user input or while the images automatically switch in sequence through settings of the electronic device (e.g., a slide show function). In the electronic device, an automatic transition method is provided in a standardized form according to a predetermined screen transition method. For example, the electronic device provides a screen transition (e.g., a slide show) by switching and displaying the images in sequence (order) at a fixed speed (e.g., a constant speed) in a predetermined specific pattern.

SUMMARY

The screen transition function provided in the conventional electronic devices only applies a predetermined transition effect. Thus, the screen transition in the conventional electronic device is not intuitive to a user and expressions thereof are limitedly provided, so that the usability (e.g., the frequency of usage) by the user may be lowered. Embodiments as disclosed herein provide a screen transition function enabling various expressions while providing intuitiveness to the user when the screen switches.

Various embodiments according to the present disclosure disclose a method and a device for recognizing a feature point (or a principal portion) of next contents (e.g., contents to be displayed subsequently) of currently displayed contents when the screen switches in the electronic device in order to provide a differentiated screen transition function based on attributes of a feature point.

Various embodiments according to this disclosure disclose a method and a device for recognizing a feature point of next contents when the screen switches in the electronic device in order to display the next contents by means of a screen transition according to a transition effect based on various attributes of the feature point.

An electronic device, according to various embodiments of the present disclosure, may include: a display; a memory; and a processor configured to be operably coupled to the display and the memory, wherein the processor is configured to: display first contents; analyze the attributes of second contents to be displayed subsequent to the first contents; determine a transition effect corresponding to the attributes of the second contents; and display the second contents based on the determined transition effect when a screen switches from the first contents to the second contents.

An operating method of an electronic device, according to various embodiments of the present disclosure, may include: displaying first contents on a display; analyzing the attributes of second contents to be displayed subsequent to the first contents; determining a transition effect corresponding to the attributes of the second contents; and displaying the second contents based on the determined transition effect when a screen switches from the first contents to the second contents.

According to certain embodiments of the present disclosure may include a computer-readable recording medium that records a program for executing the above-described method in a processor.

According certain embodiments of an electronic device and the operating method thereof it is possible to provide a differentiated transition effect depending on the attributes of a feature point by recognizing the feature point (or an object of the feature point) of the contents to be subsequently displayed when the screen switches in the electronic device. According to various embodiments, when the screen switches, the electronic device may recognize a feature point, and may determine a transition effect to be applied based on the attributes of the feature point {e.g., the size, number, shape, brightness, sharpness, proportion, direction (e.g., directivity according to size, gaze, or sharpness), or position of an object}. According to various embodiments, the electronic device may display next contents using a screen transition according to a transition effect determined based on the attributes of the feature point of the contents.

Thus, in various embodiments, the electronic device may provide a screen transition function, such as a slide show, in intuitive and versatile expression methods. For example, the electronic device, based on a feature point of next contents, may display the next contents with a different transition effect according to the attributes of the feature point, thereby providing a smooth transition between the currently displayed contents and the next contents to be displayed subsequent thereto and thereby displaying the next contents more intuitively and effectively.

As described above, the electronic device, according to various embodiments, may provide the transition effect according to the next contents during the screen transition, and may fulfill the user needs for the screen transition function. The electronic device, according to various embodiments, may contribute to improving the usability, convenience, or utility of the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
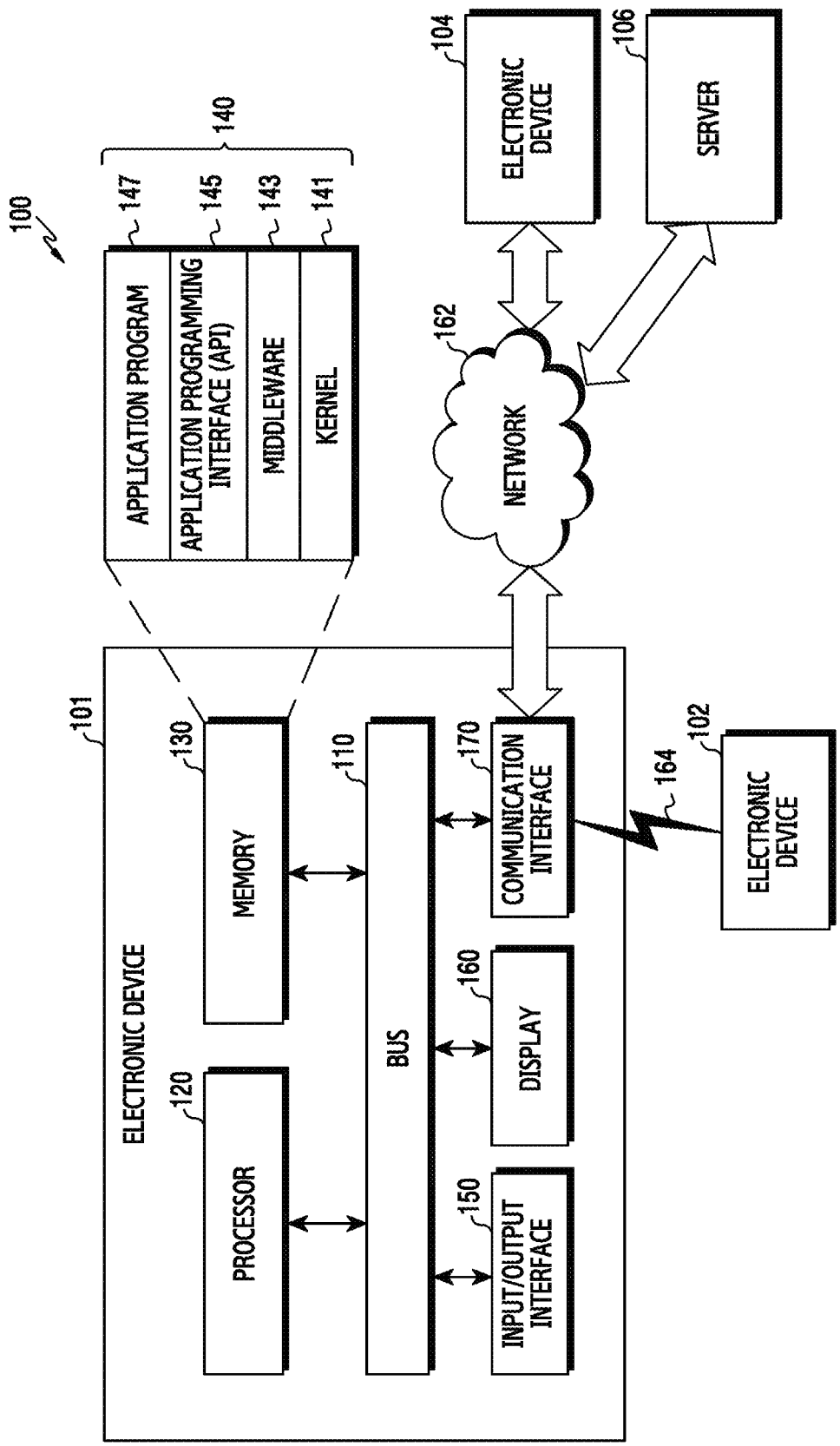
FIG. 1 is a view illustrating a network environment including an electronic device according to various embodiments of the present disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st,", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to ~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of ~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™, a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller machine (ATM) of a financial institution, point of sales (POS) of shops, an internet of things (IoT) device (e.g., an electric bulb, various sensors, a sprinkler device, a fire alarm, a thermostat, etc.).

According to certain embodiments, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

FIG. 1 illustrates a network environment system according to certain embodiments of the present disclosure.

Referring to FIG. 1, an electronic device 101 within a network environment 100 in various embodiments is described. The electronic device 101 may include a bus 110, a processor 120, a memory 130, an input output interface 150, a display 160, and a communication interface 170. In some embodiment, the electronic device 101 may omit at least one of the constituent elements or additionally have another constituent element.

The bus 110 may, for example, include a circuit coupling the constituent elements 110, 120, 150, 160 and 170 with one another and forwarding communication (e.g., a control message or data) between the constituent elements.

The processor 120 may include one or more of a central processing unit (CPU), an application processor (AP) or a communication processor (CP). The processor 120 may, for example, execute operation or data processing for control and/or communication of at least one another constituent element of the electronic device 101. The processing (or control) operation of the processor 120 according to various embodiments is specifically described with reference to the following figures.

The memory 130 may include a volatile and/or non-volatile memory. The memory 130 may, for example, store a command or data related to at least one another constituent element of the electronic device 101. According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS).

The memory 130 may store one or more programs executed by the processor 120, and may perform a function of temporarily storing input/output data. The input/output data may include, for example, files such as videos, images (e.g., photos), or audio. According to various embodiments, the memory 130 may play the role of storing the obtained data, and the data obtained in real time may be stored in a temporary storage device (e.g., a buffer) and the data determined to be stored may be stored in a permanent storage device. The memory 130 may include a computer-readable recording medium that records a program for executing a method according to various embodiments by the processor 120.

The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests.

The API 145 is, for example, an interface enabling the application program 147 to control a function provided by the kernel 141 or the middleware 143 and may, for example, include at least one interface or function (e.g., an instruction) for file control, window control, image processing, character control or the like.

The input output interface 150 may forward a command or data inputted from a user or another external device, to another constituent element(s) of the electronic device 101, or output a command or data received from the another constituent element(s) of the electronic device 101, to the user or another external device. For example, a wired/wireless headphone port, an external charger port, a wired/wireless data port, a memory card port, an audio input/output port, a video input/output port, an earphone port may be included in the input output interface 150.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. For example, the display 160 may receive a touch, gesture, proximity or hovering input that uses an electronic pen or a part of the user's body.

The display 160, for example, may provide a visual output to the user. The visual output may be provided in the form of text, graphic, a video, or a combination thereof. The display 160 may display (output) a variety of information processed in the electronic device 101. For example, the display 160 may display a user interface (UI) or a graphical user interface (GUI) in relation to the usage of the electronic device 101. According to various embodiment, the display 160 may display various user interfaces (e.g., UI or GUI) related to operations (e.g., a contents displaying operation, a screen transition operation, or the like) performed by the electronic device 101.

In various embodiments, the display 160 may include a flat display or a curved display (or a bendable display) that may be bent or rolled up without damage by means of a thin and flexible substrate-like paper. The curved display may be coupled to a housing (or bezel or body) to maintain the curved shape. In various embodiments, the electronic device 101 may be implemented by a display device, such as a flexible display, which may be freely bent and unfolded, as well as the curved display. In various embodiments, the display 160 may have a flexibility to be folded and unfolded by replacing glass substrates enclosing a liquid crystal in a liquid crystal display (LCD), a light emitting diode (LED), an organic light emitting diode (OLED), or an active OLED (AMOLED) by a plastic film. In various embodiments, the display 160 may be configured such that a curved display extends to at least one side (e.g., at least one of a left side, a right side, an upper side, or a lower side) of the electronic device 101 and is coupled to the sides of the housing while being folded to have a radius of curvature (e.g., a radius of curvature of 5 cm, 1 cm, 7.5 mm, 5 mm, 4 mm, etc.) in which the display is operable.

The communication interface 170 may, for example, establish communication between the electronic device 101 and an external device (e.g., the first external electronic device 102, the second external electronic device 104 or the server 106). For example, the communication interface 170 may be coupled to a network 162 through wireless communication or wired communication, to communicate with the external device (e.g., the second external electronic device 104 or the server 106).

The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN). According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like.

The network 162 may include at least one of a telecommunications network, for example, a computer network (e.g., local area network (LAN) or wide area network (WAN)), the Internet or a telephone network.

Each of the first and second electronic devices 102 and 104 may be a device of the same or different type from that of the electronic device 101. According to various embodiments, all or some of operations executed in the electronic device 101 may be executed in another one electronic device or a plurality of electronic devices (e.g., the electronic devices 102 and 104 or the server 106). According to an embodiment, in case where the electronic device 101 performs some function or service automatically or in response to a request, the electronic device 101 may, instead of or additionally to executing the function or service in itself, send a request for execution of at least a partial function associated with this to another device (e.g., electronic device 102, 104 or server 106). The another electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

The server 106, for example, may comprise at least one of an integration server, a provider server (or a carrier server), a content server, an internet server, a cloud server, a web server, a secure server, or a certification server.

Figure 2:
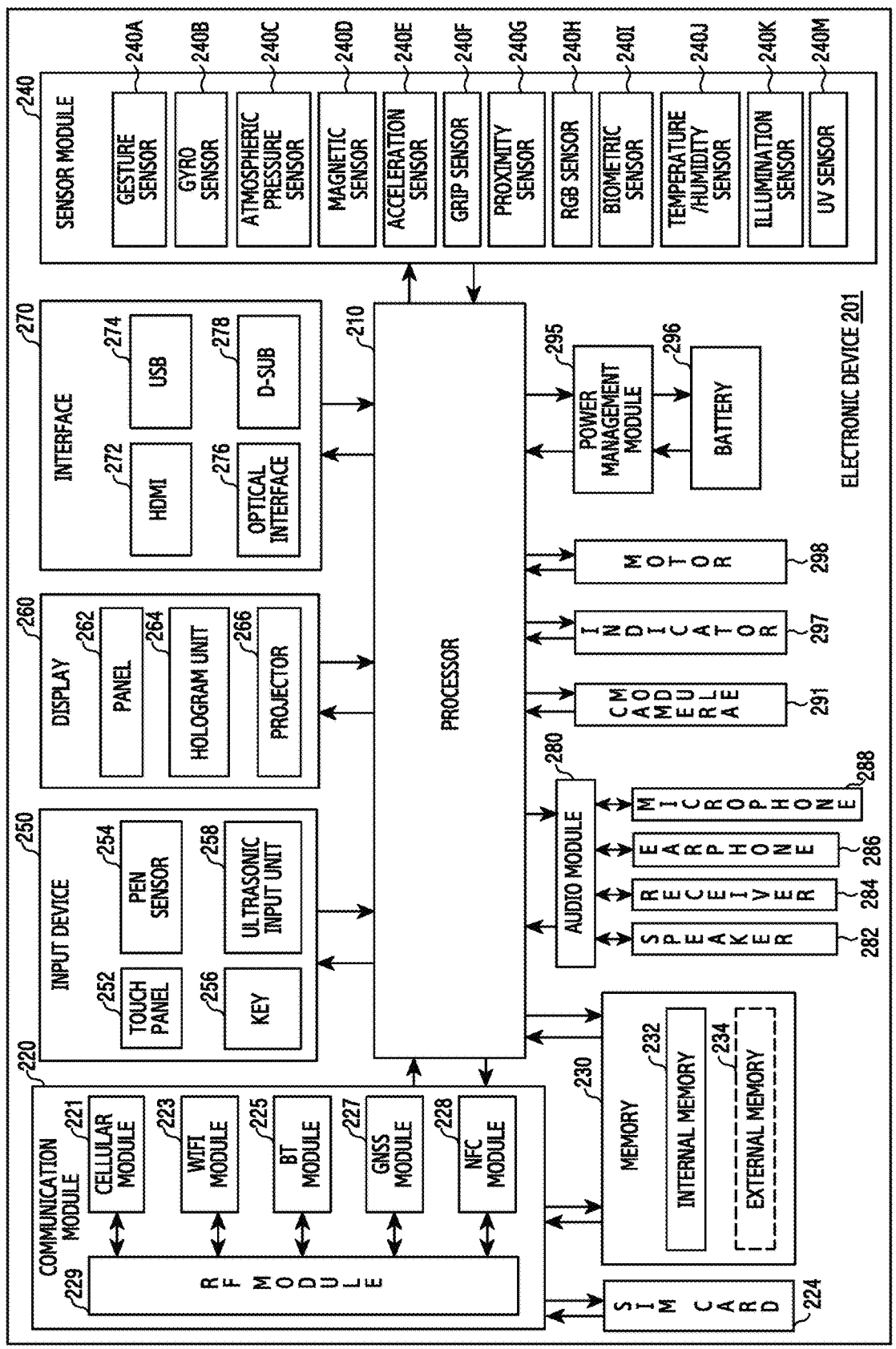
FIG. 2 illustrates, in block diagram format, an electronic device according to various embodiments of the present disclosure.

FIG. 2 illustrates, in block diagram format, an electronic device according to certain embodiments of the present disclosure.

Referring to FIG. 2, an electronic device 201 may, for example, include the entire or part of the electronic device 101 illustrated in FIG. 1. The electronic device 201 may include one or more processors (e.g., application processor (APs)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298. In various embodiments, not every element shown in FIG. 2 are not essential to the electronic device 201, and thus the electronic device 201 may be implemented to have more or fewer elements than those shown in FIG. 2. For example, the electronic device 201, according to various embodiments, may exclude some of the elements depending on the type thereof. According to various embodiments, the elements of the electronic device 201 described above may be mounted in the housing (bezel or body) of the electronic device 201, or may be formed on the outside thereof.

The processor 210 may, for example, drive an operating system or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP). The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

In various embodiments, the processor 210 may control overall operations of the electronic device 201. In various embodiments, the processor 210 may include one or more processors. For example, the processor 210 may include a communications processor (CP), an application processor (AP), an interface {e.g., general purpose input/output (GPIO)}, or an internal memory as separate elements, or they may be integrated into one or more integrated circuits. According to an embodiment, the application processor may perform various functions for the electronic device 201 by executing various software programs, and the communication processor may perform processing and control for voice communication and data communication. The processor 210 may execute a specific software module (e.g., a set of instructions) stored in the memory 230 to perform a specific function corresponding to the module.

In various embodiments, the processor 210 may control the operations of hardware modules, such as an audio module 280, an interface 270, a display 260, a camera module 291, a communication module 220, a power management module 295, a sensor module 240, and the like. According to various embodiments, the processor 210 may be electrically connected to the display 260 and the memory 230 of the electronic device 201.

According to various embodiments, the processor 210 may process an operation related to differently providing a transition effect based on the attributes of an object recognized in next contents when a screen switches in the electronic device 201.

According to various embodiments, the processor 210 may control the operations of displaying first contents on the display 260; analyzing the attributes of second contents to be displayed subsequent to the first contents; determining a transition effect corresponding to the attributes of the second contents; and displaying the second contents on the display 260 using the determined transition effect when a screen switches from the first contents to the second contents.

According to various embodiments, the processor 210 may analyze the attributes of the second contents to be subsequently displayed based on, at least in part, the time of starting the display of the first contents, the time of starting the display of the second contents, or the time of detecting the screen transition while displaying the first contents. According to various embodiments, based on, at least in part, the attributes of the second contents, such as a size, a shape, and a speed, the processor 210 may control the screen transition such that the second contents gradually appear through a transition object by gradually expanding the transition object around a feature point. According to various embodiments, the feature point may include a region or an object that is a key feature in the second contents, and the processor 210 may detect the feature point based on, at least in part, object recognition, face recognition, screen analysis, text recognition, or a point of interest (POI) set to the contents.

The processing (or control) operation of the processor 210, according to various embodiments, will be described in detail with reference to the drawings below.

The communication module 220 may, for example, have the same or similar construction with the communication interface 170. The communication module 220 may, for example, include a cellular module 221, a WiFi module 223, a Bluetooth module 225, a GNSS module 227, an near field communication (NFC) module 228, and a radio frequency (RF) module 229. Although not shown, the communication module 220 may further include, for example, a WiGig module (not shown). According to one embodiment, the WiFi module 223 and the WiGig module (not shown) may be integrated into one chip.

The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the processor 210 may provide. According to an embodiment, the cellular module 221 may include a communication processor (CP). According to some embodiment, at least some (e.g., two or more) of the cellular module 221, the WiFi module 223, the Bluetooth module 225, the GNSS module 227 or the NFC module 228 may be included within one integrated chip (IC) or IC package.

The RF module 229 may, for example, receive or transmit a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the Bluetooth module 225, the GNSS module 227 or the NFC module 228 may transmit or receive an RF signal through a separate RF module.

The WiFi module 223, for example, may refer to a module for establishing the wireless Internet connection and a wireless LAN link with external devices (e.g., the electronic device 102 or the server 106). The WiFi module 223 may be provided inside or outside the electronic device 201. The wireless Internet technology may include WiFi, WiGig, WiBro, WiMax (world interoperability for microwave access), HSDPA (high-speed downlink packet access), or mmWave (millimeter wave). The WiFi module 223 may be directly connected to the electronic device 201, or may interwork with an external device (e.g., the electronic device 104 or the like), which is connected through a network (e.g., the network 162) (e.g., the wireless Internet network), in order to thereby transmit or receive a variety of data of the electronic device 201 to or from the outside. The WiFi module 223 may remain in the switch-on state at all times, or may be turned on/off according to the setting of the electronic device or a user input.

The Bluetooth module 225 and the NFC module 228, may for example, be a short-range communication module for performing short-range communication. The short-range communication technology may use Bluetooth, Bluetooth low energy (BLE), radio frequency identification (RFID), infrared communication (IrDA), ultra wideband (UWB), Zigbee, NFC, or the like. The short-range communication module may interwork with an external device (e.g., the electronic device 102 or the like) connected to the electronic device 201 through a network (e.g., the short-range communication network) in order to transmit or receive a variety of data of the electronic device 201 to or from the external device. The short-range communication module (e.g., the Bluetooth module 225 and the NFC module 228) may remain in the switched-on state at all times, or may be turned on or off according to the setting of the electronic device 201 or a user input.

The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

In various embodiments, the memory 230 may store one or more programs, data, or instructions allowing the processor 210 to display the first contents, to analyze the attributes of the second contents to be displayed subsequent to the first contents while the first contents is displayed, to determine a transition effect corresponding to the attributes of the second contents, to determine a screen transition from the first contents to the second contents, and to display the second contents using the determined transition effect based on the determination of the screen transition. According to various embodiments, the memory 230 may store one or more programs, data, or instructions allowing the processor 210 to detect a feature point based on, at least in part, object recognition, face recognition, screen analysis, text recognition, or a point of interest (POI) set in the contents.

According to various embodiments, the memory 230 may store a mapping table for mapping transition effects according to attributes.

The memory 230 may include an extended memory (e.g., the external memory 234) or an embedded memory (e.g., the internal memory 232). The electronic device 201 may operate in conjunction with a web storage that performs a storage function of the memory 230 over the Internet.

The memory 230 may store one or more pieces of software (or software modules). For example, software elements may include an operating system software module, a communication software module, a graphic software module, a user-interface software module, a moving picture experts group (MPEG) module, a camera software module, one or more application software modules, and the like. In addition, since the module, which is a software element, may be expressed as a set of instructions, the module may be referred to as an instruction set. The module may also be expressed as a program. In various embodiments of the present disclosure, the memory 230 may include additional modules (instructions) in addition to the modules described above. Alternatively, some of the modules (instructions) may not be used as necessary.

The operating system software module may include various software elements for controlling general system operations. The control of the general system operations, for example, may refer to memory management and control, storage hardware (device) control and management, or power control and management. In addition, the operating system software module may also facilitate the communication between various hardware elements (devices) and software elements (modules).

The communication software module may enable communication with other electronic devices, such as wearable devices, smart phones, computers, servers, or handheld terminals, through the communication module 220 or the interface 270. In addition, the communication software module may be configured using a protocol structure conforming to the corresponding communication method.

The graphic software module may include various software elements for providing and displaying graphics on the display 260. In various embodiments, the term "graphics" may be used to have a meaning including text, web pages, icons, digital images, videos, animations, etc.

The user interface software module may include various software elements related to the user interface (UI). For example, the user interface software module may include content about a method or conditions in which the state of the user interface is changed.

The MPEG module may include software elements that enable processes and functions (e.g., generation, reproduction, distribution, and transmission of contents) in relation to digital contents (e.g., videos or audio).

The camera software module may include camera-related software elements that enable camera-related processes and functions.

The application module may include a web browser including a rendering engine, an email application, an instant messaging application, a word processor, a keyboard emulation application, an address book, a touch list, a widget, digital right management (DRM), an iris scanning application, context cognition, voice recognition, a position determining function, location-based services, and the like. According to various embodiments of the present disclosure, the application module may include a health-care application (e.g., measuring the amount of exercise or blood glucose) or an environmental information providing application (e.g., providing pressure, humidity, or temperature information). According to various embodiments, the application module may include one or more applications that allow the electronic device 201 to perform a screen transition (e.g., a slide show) operation.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a medical sensor 240I, a temperature/humidity sensor 240J, an illuminance sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave. According to various embodiments, the input device 250 may include an electronic pen. According to various embodiments, the input device 250 may be implemented to receive touch having a measurable force.

The display 260 (e.g., the display 160) may include a panel 262, a hologram device 264, a projector 266, and/or a control circuit for controlling them.

The panel 262 may, for example, be implemented to be flexible, transparent, or wearable. The panel 262 may be constructed as one or more modules together with the touch panel 252. According to an embodiment, the panel 262 may include a pressure sensor (or force sensor) capable of measuring the intensity of the pressure on the user's touch. The pressure sensor may be implemented integrally with the touch panel 252, or may be implemented with one or more sensors separate from the touch panel 252. The panel 262 may be mounted on the display 260, and may sense a user input by contact or proximity with respect to the surface of the display 260. The user input may include a touch input or a proximity input that is input based on at least one of a single-touch, a multi-touch, a hovering, or an air gesture. The panel 262 may receive a user input to initiate operations related to the usage of the electronic device 201, and may generate an input signal according to the user input. The panel 262 may be configured to convert a change in the pressure applied to a specific portion of the display 260 or a change in the capacitance generated therein to an electrical input signal. The panel 262 may detect a position and an area where an input tool (e.g., a user's finger, an electronic pen, etc.) touches or approaches the surface of the display 260. In addition, the panel 262 may also be configured to detect a touch pressure (e.g., force touch) according to the applied touch method.

The hologram device 264 may show a three-dimensional image to the air using an interference of light. The projector 266 may project light onto a screen, to display an image. The screen may, for example, be located inside or outside the electronic device 201.

The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The interface 270 may receive data from other electronic devices, or may receive power in order to thereby transmit the same to the respective elements in the electronic device 201. The interface 270 may transmit data in the electronic device 201 to other electronic devices. For example, the interface 270 may include a wired/wireless headphone port, an external charger port, a wired/wireless data port, a memory card port, an audio input/output port, a video input/output port, an earphone port, and the like.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is inputted or outputted through a speaker 282, a receiver 284, an earphone 286, the microphone 288 or the like. The audio module 280 may perform functions of transmitting an audio signal received from the processor 210 to an output device (e.g., the speaker 282, the receiver 284, or the earphones 286) and of transmitting an audio signal, such as a voice, received from the input device (e.g., the microphone 288) to the processor 210. The audio module 280 may convert voice/sound data into an audible sound to thus output the same through the output device under the control of the processor 210, and may convert an audio signal, such as a voice, received from the input device into a digital signal to thus transmit the same to the processor 210.

The speaker 282 or the receiver 284 may output audio data received from the communication module 220 or stored in the memory 230. The speaker 282 or the receiver 284 may output sound signals related to various operations (functions) performed by the electronic device 201. The microphone 288 may receive an external sound signal, and may process the same to an electrical voice data. The microphone 288 may have various noise reduction algorithms implemented to eliminate noise generated in the course of receiving an external sound signal. The microphone 288 may perform an input of audio streaming such as a voice command or the like.

The camera module 291 is, for example, a device able to photograph a still image and a video. According to an embodiment, the camera module 291 may include one or more image sensors (e.g., front sensor or rear sensor), a lens, an image signal processor (ISP) or a flash (e.g., an LED, a xenon lamp or the like).

According to various embodiments, the camera module 291 supports a photographing function of the electronic device 201. The camera module 291 may photograph any subject under the control of the processor 210, and may transfer the photographed data (e.g., an image) to the display 260 and the processor 210. According to various embodiments, the camera module 291, for example, may include a first camera {e.g., a color (RGB) camera} for obtaining color information and a second camera {e.g., an infrared (IR) camera} for obtaining depth information (e.g., position information and distance information of a subject). According to an embodiment, the first camera may be a front camera provided on the front surface of the electronic device 201. According to various embodiments, the front camera may be replaced by the second camera, and the first camera may not be provided on the front surface of the electronic device 201. According to various embodiments, the first camera may be disposed on the front surface of the electronic device 201 together with the second camera. According to an embodiment, the first camera may be a back camera provided on the back surface of the electronic device 201. According to an embodiment, the first camera may be configured to include a front camera and a back camera, which are provided on the front and rear surfaces of the electronic device 201, respectively.

The camera module 291 may include an image sensor. The image sensor may be implemented as a CCD (charged coupled device) or a CMOS (complementary metal-oxide semiconductor).

The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201. The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), mediaFlo™ or the like.

Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
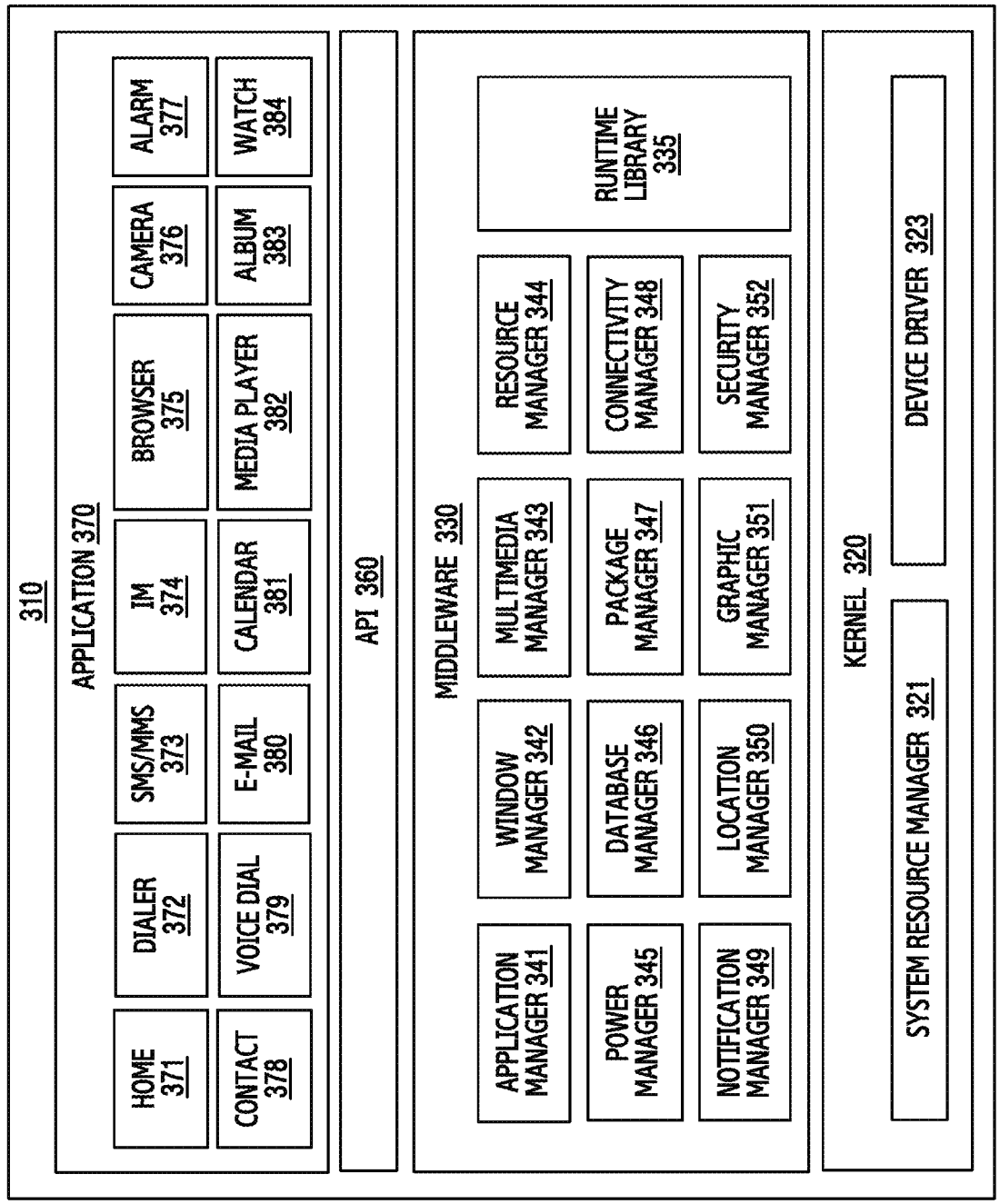
FIG. 3 illustrates, in block diagram format, a program module according to various embodiments of the present disclosure.

FIG. 3 illustrates, in block diagram format, a program module according to certain embodiments of the present disclosure.

Referring to FIG. 3, a program module 310 (e.g., the program 140) may include an Operating System (OS) for controlling resources related to an electronic device (e.g., the electronic device 101) and/or various applications (e.g., the application program 147) driven on the operating system. The operating system may, for example, comprise Android™, iOS™, Windows™, Symbian™, Tizen™ or Bada™ operating systems.

Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloaded from an external electronic device (e.g., the electronic device 102, 104, the server 106, etc.).

The kernel 320 may, for example, include a system resource manager 321 and/or a device driver 323. The system resource manager 321 may perform control of a system resource, allocation thereof, recovery thereof or the like. According to an embodiment, the system resource manager 321 may include a process management unit, a memory management unit or a file system management unit. The device driver 323 may, for example, include a display driver, a camera driver, a Bluetooth driver, a shared memory driver, a USB driver, a keypad driver, a WiFi driver, an audio driver or an inter-process communication (IPC) driver.

The middleware 330 may, for example, provide a function that the application 370 commonly needs, or provide various functions to the application 370 through the API 360 so that the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 or a security manager 352.

The runtime library 335 may, for example, include a library module that a compiler uses to add a new function through a programming language while the application 370 is executed. The runtime library 335 may perform input output management, memory management or arithmetic function processing.

The application manager 341 may, for example, manage a lifecycle of the application 370. The window manager 342 may manage a graphic user interface (GUI) resource used by a screen. The multimedia manager 343 may detect a format required for playing media files, and perform encoding or decoding of the media file by using a codec suitable to the corresponding format. The resource manager 344 may manage a source code of the application 370 or a space of a memory. The power manager 345 may, for example, manage a battery capacity, temperature, or a power supply, and provide power information required for an operation of an electronic device. According to an embodiment, the power manager 345 may interwork with a basic input/output system (BIOS). The database manager 346 may, for example, create, search or change a database that will be used by the application 370. The package manager 347 may manage installation or updating of an application that is distributed in a form of a package file.

The connectivity manager 348 may, for example, manage wireless connectivity. The notification manager 349 may, for example, provide events such as an arrival message, an appointment, a proximity notification, etc. to a user. The location manager 350 may, for example, manage location information of an electronic device. The graphic manager 351 may, for example, manage a graphic effect that will be provided to a user, or a user interface related with this. The security manager 352 may, for example, provide system security or user authentication.

According to certain embodiments, the middleware 330 may include a telephony manager for managing a voice or video telephony function of an electronic device, or a middleware module capable of forming a combination of functions of the aforementioned constituent elements. According to an embodiment, the middleware 330 may provide a module that is specialized based on the type of an operating system. The middleware 330 may dynamically delete some of the existing constituent elements or add new constituent elements. The API 360 is, for example, a set of API programming functions, and may be provided to have another construction in accordance with the operating system. For example, Android or iOS may provide one API set by platform, and Tizen may provide two or more API sets by platform.

The application 370 may, for example, include a home 371, a dialer 372, a short message service (SMS)/multimedia messaging service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, health care (e.g., measuring a momentum, a blood sugar or the like), or an environment information (e.g., air pressure, humidity or temperature information) provision application. According to various embodiments, the application 370 may include an application that allows screen switching or a screen transition (e.g., slide show operation) to be performed.

According to some embodiments, the application 370 may include an information exchange application that may support information exchange between an electronic device and an external electronic device. The information exchange application may, for example, include a notification relay application for relaying specific information to the external electronic device, or a device management application for managing the external electronic device. For example, the notification relay application may relay notification information generated by another application of an electronic device to an external electronic device, or receive notification information from the external electronic device to provide the received notification information to a user. The device management application may, for example, install, delete or update a function (e.g., turn-on/turn-off of the external electronic device itself (or some constituent components) or adjustment of a brightness (or resolution) of a display) of the external electronic device that communicates with the electronic device, or an application operating in the external electronic device. According to certain embodiments, the application 370 may include an application (e.g., a health care application of a mobile medical instrument) designated according to an attribute of the external electronic device. According to an embodiment, the application 370 may include an application received from the external electronic device. At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

The term "module," as used in the present document may include a unit consisting of hardware, software or firmware and, for example, may be used interchangeably with the terms "logic", "logic block", "component", "circuit" or the like. The "module" may be an integrally configured component or the minimum unit performing one or more functions or a part thereof. The "module" may be implemented mechanically or electronically and, for example, may include an application-specific integrated circuit (ASIC) chip, field-programmable gate arrays (FPGAs) or a programmable logic device, which has been known or will be developed in future, performing some operations. At least a part of an apparatus (e.g., modules or functions thereof) or method (e.g., operations) according to various embodiments may, for example, be implemented by an instruction that is stored in a computer-readable storage media (e.g., memory 130 or 230) in the form of a program module. In case where the instruction is executed by a processor (e.g., the processor 120 or 210), the processor may perform a function corresponding to the instruction.

The computer-readable recording media may include a hard disk, a floppy disk, a magnetic media (e.g., a magnetic tape), an optical recording media (e.g., a compact disc-read only memory (CD-ROM) or a DVD), a magneto-optical media (e.g., a floptical disk), an internal memory, etc. The instruction may include a code that is made by a compiler or a code that is executable by an interpreter. The module or program module according to various embodiments may include at least one or more of the aforementioned constituent elements, or omit some, or further include another constituent element. Operations carried out by the module, the program module or the another constituent element according to various embodiments may be executed in a sequential, parallel, repeated or heuristic manner, or at least some operations may be executed in different order or be omitted, or another operation may be added.

According to various embodiments, a recording medium may include a computer-readable recording medium that records a program for executing various methods, which will be described below, in the processor 120 or 210.

Figure 4:
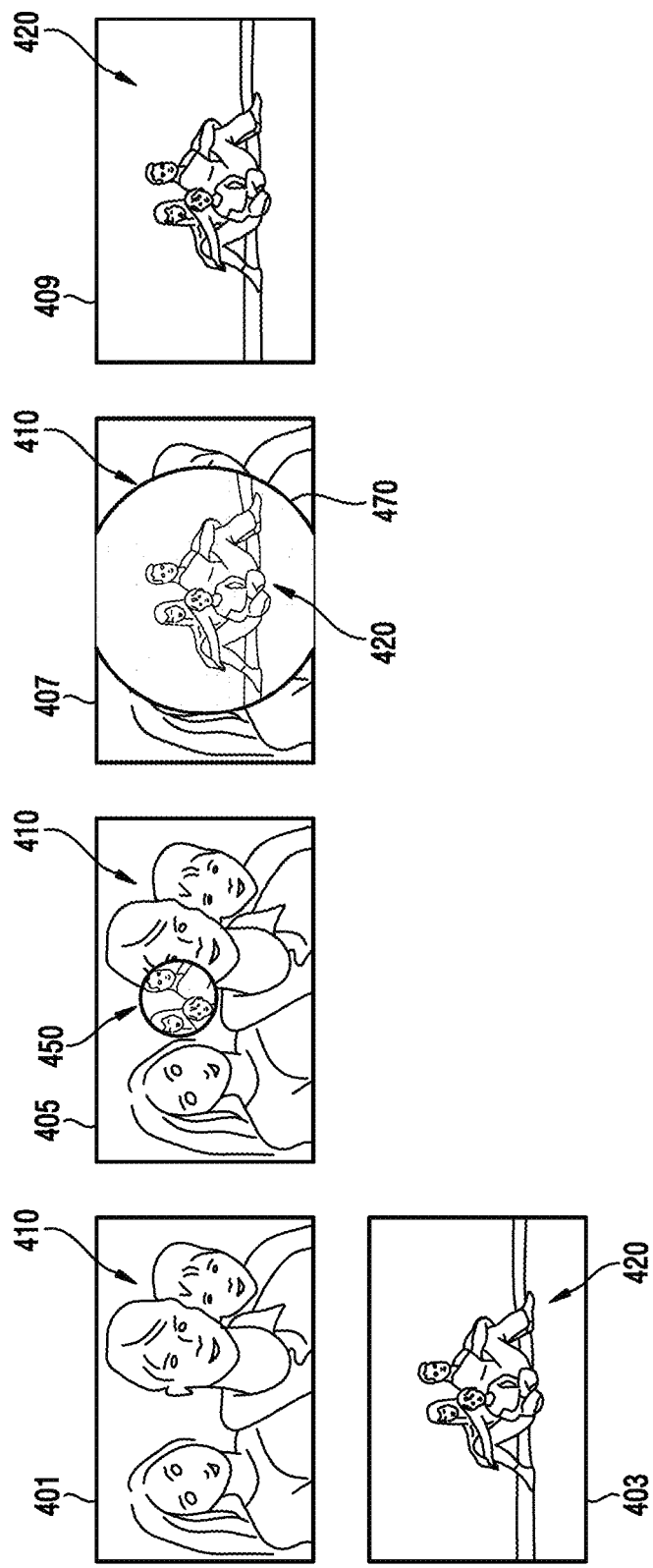
FIG. 4 illustrates an exemplary view of a screen transition in an electronic device according to various embodiments of the present disclosure.

FIG. 4 illustrates an exemplary view of an example of providing a screen transition in an electronic device according to various embodiments of the present disclosure.

Referring to the non-limiting example of FIG. 4, according to certain embodiments, a screen example 401 may show the state in which the first contents 410 are displayed through a display of the electronic device (e.g., the display 160 or 260 in FIG. 1 or FIG. 2). A screen example 403 may represent the second contents 420 to be displayed subsequent to the first contents 410 through a screen transition. According to an embodiment, the first contents 410 and the second contents 420 may have a sequence thereof, and the first contents 410 may be displayed prior to the second contents 420. According to various embodiments, the contents 410 or 420 may include various media contents encompassing static contents, such as images, photos, screenshots, or the like, and dynamic contents, such as videos, animated images, or the like, which can be displayed through the display 160 or 260 of the electronic device and can be used for the screen transition.

According to various embodiments, when starting the screen transition (when starting a slide show) (for example, when switching from the first contents 410 to the second contents 420) while the first contents 410 are displayed as shown in the screen example 401, the electronic device may detect a feature point 450 (or a principal portion) of the second contents as shown in a screen example 405, and may perform the screen transition based on the detected feature point 450.

In various embodiments, the feature point 450 may represent a region or an object that is a key feature in the corresponding contents. According to one exemplary embodiment, the feature point 450 may be detected (or identified) from the contents based on various objects such as a person, a face, things, object, or the like. According to some embodiments, the feature point 450 may also be detected based on various POIs (points of interest) contained in the contents or various POIs set to the contents by the user. For example, the POIs may include a region of interest, an object of interest, or a tag of a user, which is contained (or set) in the contents. The electronic device may compare information contained in the contents with the POIs in order to thereby detect (or identify) a feature point intended by the user. FIG. 4 illustrates an example in which the feature point 450 is detected based on a specific object (e.g., a face region) from the second contents 420.

The electronic device, according to some embodiments, perform the screen transition based on the detected feature point 450 as shown in the screen example 405. For example, the electronic device may display the second contents 420 on the display 160 or 260 by variably applying a transition effect for a predetermined period of time or duration based on the feature point 450.

According to various embodiments, the electronic device may determine a transition effect based on the attributes corresponding to a feature point 450 (or an object indicated by the feature point) of next contents when performing the screen transition. According to some embodiments, the electronic device may include a mapping table for mapping transition effects according to the attributes as shown in Table 1 below. In various embodiments, the mapping table may be stored in the memory of the electronic device (e.g. the memory 130 or 230 in FIG. 1 or FIG. 2). In various embodiments, the attributes include, for example, the size, the number, the shape, the proportion, the sharpness, the brightness, the direction (e.g., the direction according to a gaze, a size, or sharpness), or the position of the object(s) included (positioned) in the feature point. The attributes analyzed by the electronic device, according to various embodiments, will be described below with reference to FIG. 7.

TABLE 1

| Attributes | Transitions | Examples |
| --- | --- | --- |
| Attribute 1 | Transition 1 | Box out |
| Attribute 2 | Transition 2 | Circle out 1 (Acceleration 1) |
| Attribute 3 | Transition 3 | Circle out 2 (Acceleration 2) |
| Attribute 4 | Transition 4 | Ellipse out & Direction |
| Attribute 5 | Transition 5 | Object's Shape out |
| Attributes 1 & 5 | Transition 6 | Circle out & Brightness Correction (Variation) |
| . . . | . . . | . . . |

Referring to Table 1, the electronic device may, according to certain embodiments, classify one or more attributes into the respective attributes (e.g., Attribute 1 to Attribute 5) or a combination thereof (e.g., Attributes 1 & 5), and may map each attribute with a transition effect (e.g., Transition 1 to Transition 6). According to various embodiments, the transition effect for each attribute may be set as default, and may be variously changed by the user.

According to at least one embodiment, if the electronic device determines Attribute 1 as an attribute of the feature point 450, the electronic device may determine Transition 1 as a transition effect, and may display the second contents 420 by means of a screen transition according to Transition 1. For example, the electronic device may switch the screen from the first contents 410 to the second contents 420 in a box-out method in which a rectangular box spreads from the inside (e.g., the position of the feature point) to the outside around the feature point 450.

According to certain embodiments, if the electronic device determines Attribute 2 as an attribute of the feature point 450, the electronic device may determine Transition 2 as a transition effect, and may display the second contents 420 by means of a screen transition according to Transition 2. For example, the electronic device may switch the screen from the first contents 410 to the second contents 420 in a circle-out 1 method in which a small circle spreads from the inside (e.g., the position of the feature point) to the outside around the feature point 450.

According to some embodiments, if the electronic device determines Attribute 3 as an attribute of the feature point 450, the electronic device may determine Transition 3 as a transition effect, and may display the second contents 420 by means of a screen transition according to Transition 3. For example, the electronic device may switch the screen from the first contents 410 to the second contents 420 in a circle-out 2 method in which a big circle spreads from the inside (e.g., the position of the feature point) to the outside around the feature point 450.

According to various embodiments, the electronic device may determine an initial size of a transition object (TO) 470 {e.g., TO1 (a small circle), TO2 (a medium circle), and TO3 (a big circle)} based on the size of an object, and may determine acceleration at which the transition object 470 switches (e.g., a screen transition interval) according to the determined size of the transition object 470. According to various embodiments, the transition object 470 may be provided as various shapes corresponding to, for example, a circle, a rectangle, a triangle, or the shape of an object, and may be implemented by a GUI that extends, shrinks, fades in, or fades out according to the screen transition effect.

For example, in relation to Attribute 2, the electronic device may allow a transition object 470 (e.g., a circle) having a small size to change (expand) from the inside to the outside for the duration set as Acceleration 1 (e.g., duration=1000 ms) according to the circle-out 1 (Acceleration 1) method. For example, in Attribute 3, the electronic device may allow a transition object 470 (e.g., a circle) having a big size to change (expand) from the inside to the outside for the duration set as Acceleration 2 (e.g., duration=1000 ms) according to the circle-out 2 (Acceleration 2) method. According to some embodiments, the electronic device may provide a quick change in the transition object 470 (e.g., Acceleration 1) for the set duration in the case where the initial size of the transition object 470 is small (e.g., the circle-out 1 method). According to an embodiment, the electronic device may provide a slow change in the transition object 470 (e.g., Acceleration 2) for the set duration in the case where the initial size of the transition object 470 is big (e.g., the circle-out 2 method). In various embodiments, the electronic device may differentiate and provide a speed at which contents or at least a part thereof appear with different acceleration attributes, rather than a constant acceleration with respect to a fixed time attribute (screen transition interval or duration).

Referring back to the non-limiting example of FIG. 4, the electronic device may switch the first contents 410 displayed on the display 160 or 260 to the second contents 420 by gradually expanding the transition object 470 according to the determined transition effect, as shown in the screen example 405, the screen example 407, and the screen example 409.

According to various embodiments, the electronic device may determine the transition effect corresponding to each attribute in the manner described above, and may change the transition object 470 in various manners according to the determined transition effect, thereby providing a variety of screen transitions. The operational examples for managing the transition effect, according to various embodiments, will be described later with reference to the accompany drawings.

As described above, an electronic device, according to various embodiments, may include: a display 160 or 260; a memory 130 or 230; and a processor 120 or 210 configured to be operably coupled to the display and the memory, wherein the processor is configured to: display first contents; analyze the attributes of second contents to be displayed subsequent to the first contents; determine a transition effect corresponding to the attributes of the second contents; and display the second contents based on the determined transition effect when a screen switches from the first contents to the second contents.

According to various embodiments, the processor may be configured to: detect a feature point of the second contents while displaying the first contents; and determine a transition effect corresponding to at least one of the attributes of an object positioned at the feature point.

According to various embodiments, the attributes may include the size, the number, the shape, the proportion, the sharpness, the brightness, the direction, or the position of the object(s) included in the feature point.

According to various embodiments, the feature point may include a region or an object that is a key feature in the contents, and the processor may be configured to detect the feature point based on, at least in part, object recognition, face recognition, screen analysis, text recognition, or a point of interest (POI) set in the contents.

According to various embodiments, the processor may be configured to differently provide at least one of a transition speed, a transition color, or a transition form by a transition object based on the attributes of an object included in the feature point.

According to various embodiments, the processor may be configured to provide the transition effect at different accelerations according to the attributes for a duration set for the screen transition.

According to various embodiments, the processor may be configured to: provide a quick change in the transition object during the duration when the initial size of the transition object is small; and provide a slow change in the transition object during the duration when the initial size of the transition object is big.

According to various embodiments, the processor may be configured to display the second contents by means of a screen transition according to a predetermined transition effect when no feature point is detected in the second contents.

According to various embodiments, the processor may be configured to control the screen transition by gradually expanding a transition object around the feature point based on, at least in part, the attributes of the second contents, such as a size, a shape, or a speed, such that the second contents gradually appear through the transition object.

According to various embodiments, the first contents and the second contents may include static contents or dynamic contents, which can be displayed through the display and can be used for the screen transition.

Hereinafter, an operating method, according to various embodiments of the present disclosure, will be described with reference to the accompanying drawings. For example, the following description will be made in detail of examples in which the electronic device recognizes a feature point of contents when the screen switches, determines a transition effect based on the attributes of the recognized feature point, and performs a differentiated screen transition based on the determined transition effect. However, since the various embodiments are not restricted or limited by the following description, it should be noted that applications can be made to the various embodiments based on embodiments that will be described below. Hereinafter, various embodiments of the present disclosure will be described based on an approach of hardware. However, various embodiments of the present disclosure include a technology that uses both hardware and software and thus, the various embodiments of the present disclosure may not exclude the perspective of software.

Figure 5:
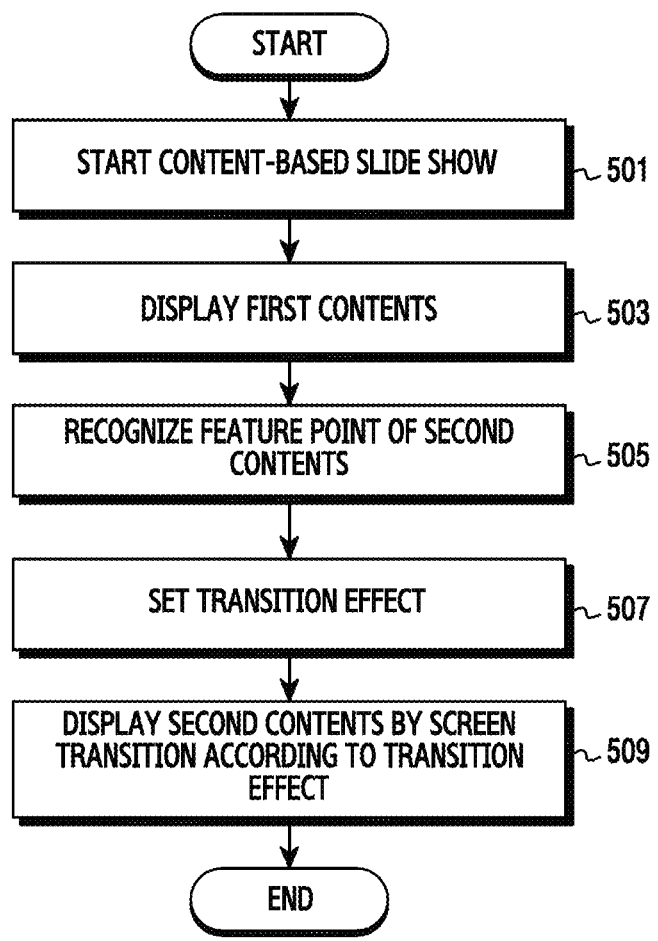
FIG. 5 illustrates, in flowchart format, an operating method of an electronic device according to various embodiments of the present disclosure.

FIG. 5 illustrates, in flowchart format, an operating method of an electronic device according to various embodiments of the present disclosure.

Referring to the non-limiting example of FIG. 5, in operation 501, a processor (e.g., one or more processors including processing circuitry) (e.g., the processor 120 or 210 of FIG. 1 or FIG. 2, hereinafter, the processor 210) of an electronic device (e.g., the electronic device 101, 201, 102, or 104 of FIG. 1 or FIG. 2) may initiate a content-based slide show. According to certain embodiments, the processor 210 may execute a gallery application, and may start a slide show based on a plurality of images (e.g., photos) according to the user selection or a plurality of pre-configured images. According to at least one embodiment, the processor 210 may execute a video editor application, and may start a slide show based on a plurality of videos according to the user selection. In various embodiments, the slide show may sequentially display two or more subsequent contents, and may encompass a function of switching the screen. In various embodiments, a plurality of images and/or a plurality of videos may have a specific order between the respective contents.

In operation 503, the processor 210 may display first contents on a display (e.g., the display 160 or 260 of FIG. 1 or FIG. 2) in response to detection of the start of the slide show.

In operation 505, the processor 210 may recognize a feature point of the second contents. In various embodiments, the processor 210 may process an operation of recognizing the feature point of the second contents sequentially or in parallel with respect to the display of the first contents. In various embodiments, the first contents may refer to current contents having a higher priority than the second contents, which are currently displayed, and the second contents may refer to next contents having a lower priority than the first contents, which are displayed subsequent to the first contents. According to various embodiments, the processor 210 may recognize an object of the feature point by analyzing the second contents subsequent to the first contents while displaying the first contents, and may determine the attributes of the corresponding object (e.g., information on the size, the number, the shape, the position, the sharpness, or the brightness difference).

In the non-limiting example of FIG. 5, at operation 507, the processor 210 may determine a transition effect. According to various embodiments, the processor 210 may determine a transition effect corresponding to the attributes of the recognized object positioned at the feature point. According to an embodiment, the processor 210 may determine a corresponding transition effect based on at least one attribute, such as the size, the number, the shape, or the brightness difference of the object(s) positioned at the feature point. In various embodiments, the electronic device may provide differentiated transition effects according to the attributes of the object.

In operation 509, the processor 210 may display the second contents on the display by means of a screen transition according to the determined transition effect. According to some embodiments, the processor 210 may switch the screen from the first contents to the second contents according to the transition effect by gradually expanding the transition object around the feature point so as to reduce the display density of the first contents (for example, the first contents gradually disappears) and so as to increase the density of the second contents displayed through the transition object (for example, the second contents gradually appears). The second contents, during the screen transition, may gradually appear from at least a portion thereof based on the feature point of the second contents, and may be displayed throughout the whole area of the display at the end time of a predetermined duration (e.g. duration=1000 ms).

Figure 6:
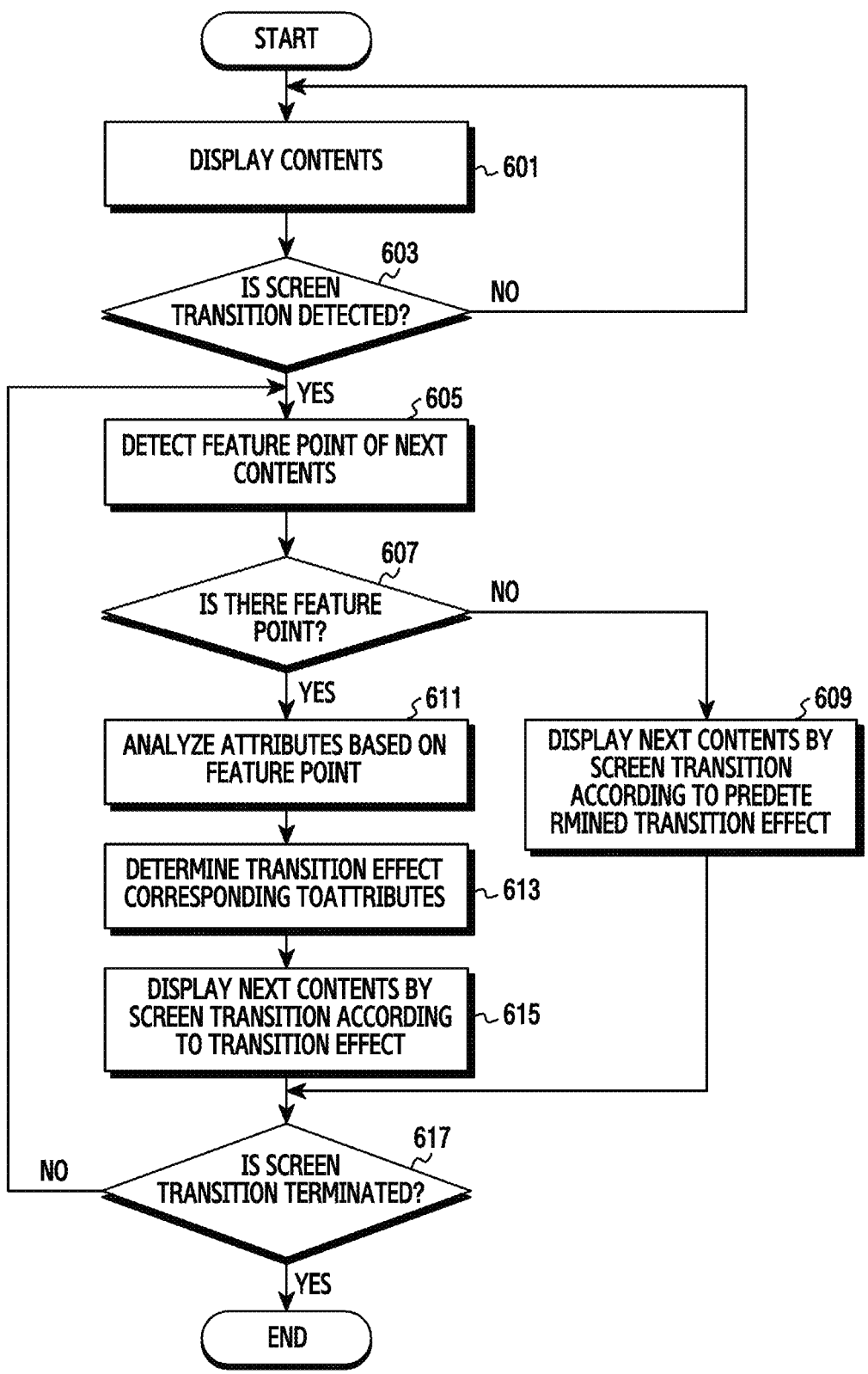
FIG. 6 illustrates, in flowchart format, a method of providing a screen transition in an electronic device according to various embodiments of the present disclosure.
Figure 7:
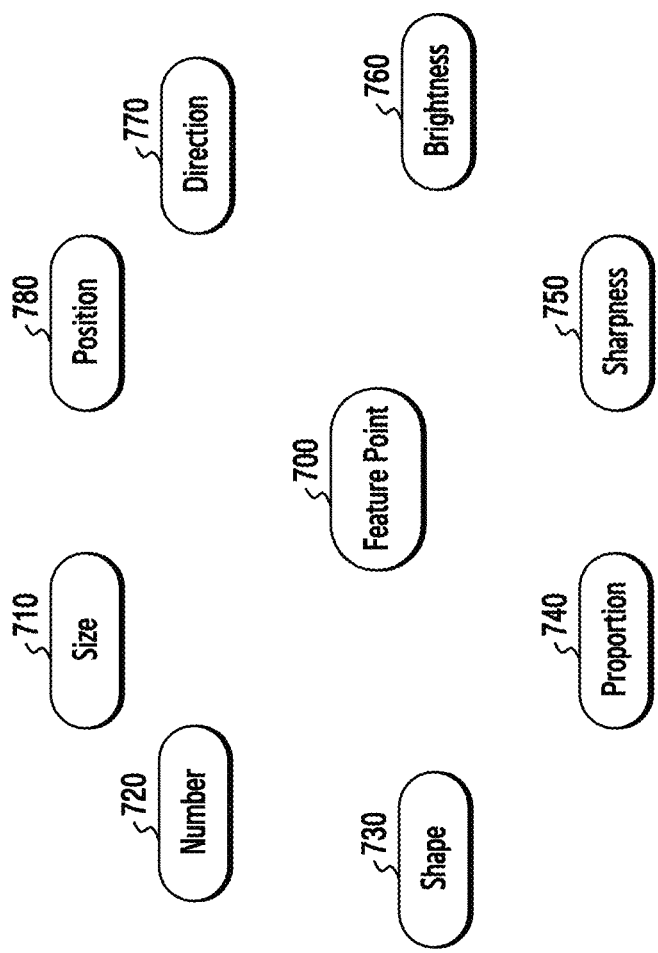
FIG. 7 illustrates an exemplary view of attributes considered by the electronic device according to various embodiments of the present disclosure.

FIG. 6 illustrates, in flowchart format, operations of a method of providing a screen transition in an electronic device according to various embodiments of the present disclosure. FIG. 7 illustrates an example of attributes considered by an electronic device according to various embodiments of the present disclosure.

Referring to FIG. 6, the processor 210 of the electronic device may display contents in operation 601. According to various embodiments, the contents may include various media contents encompassing static contents, such as images, photos, screenshots, or the like, and dynamic contents, such as videos, animated images, or the like, which can be displayed through the display 160 or 260 of the electronic device and can be used for the screen transition.

In the non-limiting example of FIG. 6, at operation 603, the processor 210 may determine whether or not a screen transition is detected while the contents are displayed. According to an embodiment, the processor 210 may determine whether or not to switch the screen according to the presence or absence of next contents to be displayed in association with and subsequent to the currently displayed contents. According to at least one embodiment, the processor 210 may determine the screen transition when the electronic device is executing a function corresponding to the screen transition such as a slide show or a video editor.

If it is determined that no screen transition is detected at operation 603, (NO in operation 603), the processor 210 may proceed to operation 601 so as to maintain the display state of the contents, and may then perform an operation corresponding to a user input. For example, the processor 210 may display other contents by switching the currently displayed contents thereto in response to a user input, or may terminate the display of the contents.

If it is determined that a screen transition is detected in operation 603 (YES in operation 603), the processor 210 may detect a feature point of next contents at operation 605. According to various embodiments, the processor 210 may perform an operation of detecting a feature point of next contents serially or in parallel with respect to the display of the contents. According to various embodiments, the processor 210 may recognize an object corresponding to the feature point by analyzing the next contents subsequent to the current contents while the contents are displayed. In various embodiments, the feature point may indicate a region or an object that is a key feature in the corresponding contents. According to some embodiments, the feature point may be detected based on various objects, such as a person, a face, things, object, or the like, from the contents. According to certain embodiments, the feature point may also be detected based on various POIs included in the contents or set in the contents by the user. For example, the POIs may include a region of interest, an object of interest, or a tag of a user, which is contained (or set) in the contents, and the feature point intended by the user may be detected by comparing information contained in the contents with the POIs.

In the non-limiting example of operation 607, the processor 210 determines whether or not a feature point is detected from the next contents.

If no feature point is detected from the next contents in operation 607 (NO in operation 607), the processor 210 may control so as to display the next contents by means of a screen transition according to a predetermined transition effect in operation 609.

If a feature point is detected from the next contents in operation 607 (YES in operation 607), the processor 210 may analyze attributes based on the detected feature point in operation 611. According to certain embodiments, the processor 210 may analyze the attributes of an object corresponding to the feature point using object recognition, face recognition, screen analysis, text recognition, or other attribute recognition methods. In various embodiments, for example, the attributes may be represented as in the example of FIG. 7.

As shown in the non-limiting example of FIG. 7, the processor 210, for example, may analyze the attributes by considering at least one of the size 710, the number 720, the shape 730, the proportion 740, the sharpness 750, the brightness 760, the direction 770, or the position 780 of the object(s) recognized from the feature point or objects of the feature point (hereinafter, referred to as a feature point 700) based on various methods.

In various embodiments, the object size 710, for example, may indicate the size of an object recognized in the contents. According to at least one embodiment, the object size 710 may be obtained by predetermining a plurality of size values in a specific range, such as a first size, a second size, or a third size, and by determining the size based on the corresponding size values. According to an embodiment, the object size 710 may also be determined based on one or more reference sizes.

In various embodiments, the number 720 of objects, for example, may represent the number of objects recognized in the contents. For example, the number 720 of objects may represent the number of persons, faces, or things. According to various embodiments, when the electronic device recognizes a plurality of objects from the contents, the electronic device may distinguish between the sizes of the plurality of objects, and may process adjacent objects having the same or similar sizes as one object by associating the same. According to at least one embodiment, if three adjacent faces having similar sizes are recognized, the three faces may be processed as one object. According to various embodiments, when the electronic device recognizes a plurality of objects from the contents, the electronic device may set an independent transition object for each object based on the attributes thereof, or may set a single transition object including the respective objects, thereby providing a transition effect.

In various embodiments, the object shape 730, for example, may represent the shape of an object (e.g., circle, triangle, rectangle, polygon, etc.) recognized in the contents. For example, the object shape 730 may be obtained by distinguishing a person, an animal, things, or text from each other based on object recognition and by extracting the shape thereof from the distinguished objects according to various techniques such as edge detection.

In various embodiments, the object proportion 740, for example, may represent the ratio of an object (or the feature point) recognized in the contents to the contents (or a screen). According to an embodiment, the object proportion 740 may be divided into a height proportion or an area proportion of an object to the contents. According to an embodiment, for example, if a person is recognized as an object, the object proportion 740 may comprise a proportion indicating whether the whole body (e.g., the whole photo of the person) or only a part (e.g., a partial photo of the person such as a face or an upper body part) of the person.

In various embodiments, the object sharpness 750, for example, may represent the sharpness (or transparency) of an object recognized in the contents. For example, if a plurality of objects are recognized in the contents, the sharpness may be distinguished between the plurality of objects.

In various embodiments, the object brightness 760, for example, may represent the brightness of the contents themselves or the brightness of at least a portion (e.g., the feature point) of the contents. According to some embodiments, the electronic device may determine the difference in the brightness between the contents consecutively provided. In addition, the electronic device may provide a smooth transition between the contents, and may prevent glare caused by the brightness difference based on, at least in part, brightness correction or color correction when the screen switches.

In various embodiments, the object direction 770, for example, may indicate the directivity of an object recognized in the contents. According to an embodiment, the object direction 770 may be an attribute for determining the moving direction of a transition object. For example, the electronic device may determine the moving direction of a transition object depending on a gaze (e.g., left, right, front, or the like) of an object, the movement of an object, the size of an object, the sharpness of an object, or the like.

In various embodiments, the object position 780, for example, may represent the position (e.g., coordinates, a region, etc.) of an object recognized in the contents. According to an embodiment, the object position 780 may be an attribute for determining the position (e.g., coordinates, a region, etc.) where the transition object is initiated. For example, the electronic device may set a start position of the transition object at a specific position based on the position of an object positioned at the feature point, or may set the size and the start position of the transition object to include all of the objects based on a plurality of positions (e.g., regions) of the objects positioned at the feature point.

Referring back to FIG. 6, the processor 210 may determine a transition effect corresponding to the attributes in operation 613. According to various embodiments, the processor 210 may provide different screen transition effects based on the analyzed attributes. For example, the processor 210 may provide different transition speeds, transition colors, transition forms by the transition object based on the attributes such as the size, the number, or the shape of the object(s) positioned at the feature point. According to at least one embodiment, the transition effect may be set differently depending on the attributes of the object (for example, in the case where the object has a rectangular shape, such as bags, or a circular shape, such as fruits, or the object has two or more faces). According to certain embodiments, the transition effect may be set such that the screen smoothly switches by correcting colors during the screen transition depending on the brightness difference of the contents (objects) that are consecutively provided according to the screen transition. According to some embodiments, the transition effect may be set such that the slides pass relatively quickly in the case of a big object and slowly in the case of a small object or a multitude of objects.

In operation 615, the processor 210 may display the next contents on the display by means of a screen transition according to the determined transition effect. According to at least one embodiment, the processor 210 may switch between the current contents and the next contents according to the transition effect by gradually expanding the transition object around the feature point so as to reduce the display density of the current contents (for example, the current contents gradually disappears) and so as to increase the density of the next contents displayed through the transition object (for example, the next contents gradually appears). The next contents, during the screen transition, may gradually appear from at least a portion thereof based on the feature point of the next contents, and may be displayed throughout the whole area of the display at the end time of a predetermined duration (e.g. duration=1000 ms).

In the non-limiting example of FIG. 6, at operation 617, the processor 210 may determine whether or not the screen transition is to be terminated. According to an embodiment, the processor 210 may determine whether or not the screen transition is to be terminated according to whether or not there are other contents subsequent to the next contents (e.g., the contents of a next order) at the time of detecting that the next contents are displayed throughout the whole area (e.g., screen transition completion time) or while processing the screen transition. For example, if there are other contents, the processor 210 may determine continuation of the screen transition, and if there are no other contents, the processor 210 may determine the termination of the screen transition.

If, at operation 617, it is determined that the screen transition is not to be terminated, the processor 210 may proceed to operation 605 in order to perform operation 605 and the operations following the same.

If, at operation 617, it is determined that the screen transition is to be terminated, the processor 210 may terminate the screen transition operation while maintaining the display of the next contents (e.g., currently displayed contents after the screen transition).

Hereinafter, operational examples, according to various embodiments of the present disclosure, will be described with reference to the accompanying drawings. For example, hereinafter, a description will be made of examples in which the screen transition is differently performed according to different transition effects based on the recognized attributes of the feature point.

Figure 8A:
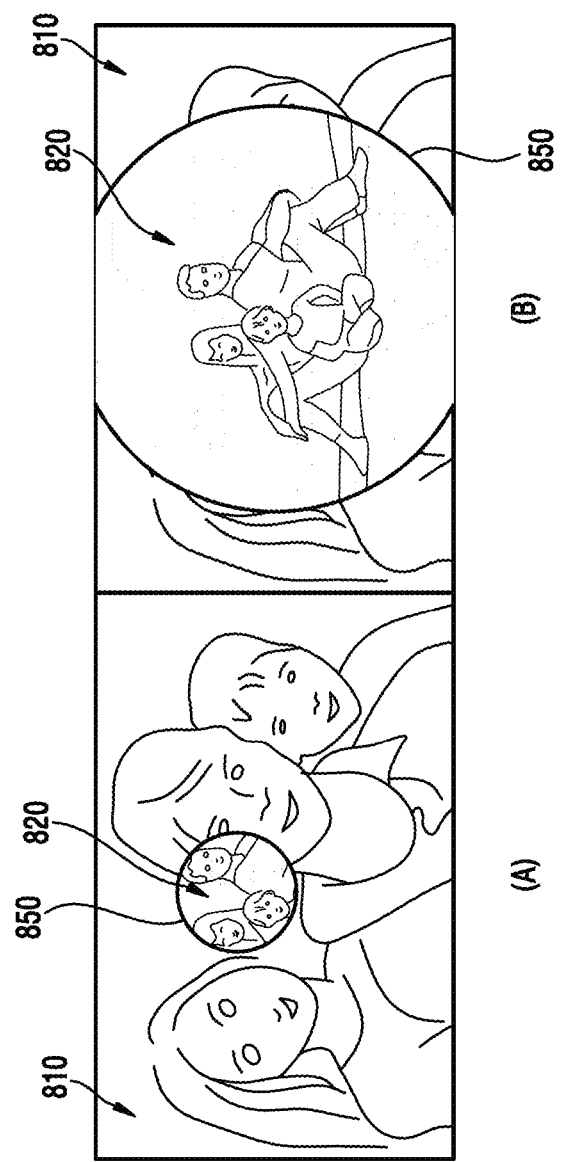
FIGS. 8A and 8B are views illustrating examples of providing a screen transition in an electronic device according to various embodiments of the present disclosure.
Figure 8B:
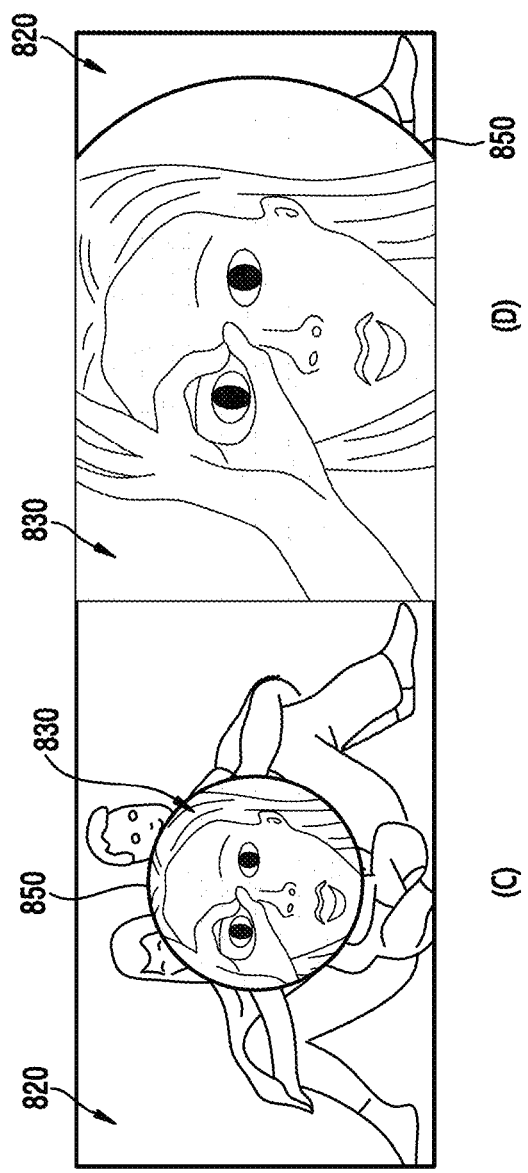

FIGS. 8A and 8B illustrate examples of providing a screen transition in an electronic device according to various embodiments of the present disclosure.

In various embodiments, FIGS. 8A and 8B show examples of providing different screen transition effects based on the size of a feature point (or an object) recognized by the electronic device in the next contents (e.g., the contents to be subsequently displayed according to the screen transition).

FIG. 8A shows a non-limiting example in which the recognized region of an object is small in the second contents 820 (e.g., contents to be displayed subsequent to the first contents 810) following the first contents 810 (e.g., currently displayed contents).

Referring to FIG. 8A, when the size of an object positioned at a feature point of the second contents 820 is small (for example, a first size) as shown in a screen example (A), the electronic device may provide the transition object 850 by slowly expanding the same from a small size (e.g., a size corresponding to the first size) at a low acceleration (for example, by adjusting the degree of expansion jumping of the transition object 850 to be small) as shown in a screen example (B).

FIG. 8B shows a non-limiting example in which the recognized region of an object is big in the third contents 830 (e.g., contents to be displayed subsequent to the second contents 820) following the second contents 820 (e.g., currently displayed contents).

Referring to FIG. 8B, when the size of an object positioned at a feature point of the third contents 830 is big (for example, a second size) as shown in a screen example (C), the electronic device may provide the transition object 850 by rapidly expanding the same from a big size (e.g., a size corresponding to the second size) at a high acceleration (for example, by adjusting the degree of expansion jumping of the transition object 850 to be large) as shown in a screen example (D).

In various embodiments, the initial size of the transition object 850 (e.g., a shape corresponding to a circle, a rectangle, a triangle, or the shape of an object) may be provided differently depending on the size of an object. In various embodiments, the screen transition using the transition object 850 may be performed differently (for example, at a high speed, a medium speed, or a low speed) depending on the size of an object, and may be operated at different accelerations for a predetermined duration. For example, in various embodiments, a change in the transition objects 850 may be performed by applying different speeds and accelerations (e.g., easing values). Further, non-limiting examples thereof are shown in FIGS. 9A and 9B.

Figure 9A:
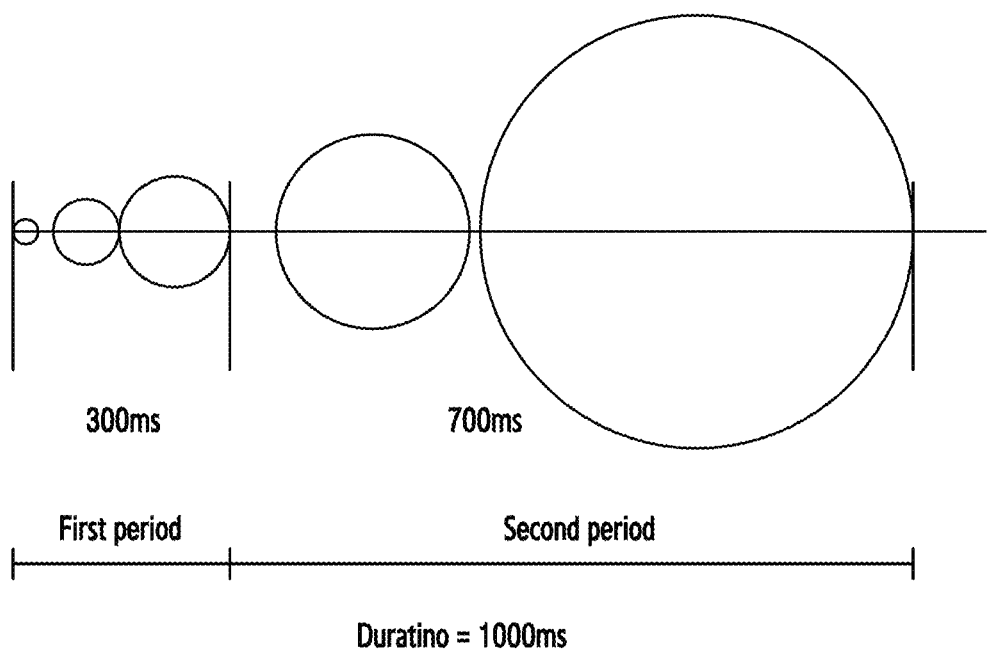
FIGS. 9A and 9B are views illustrating examples for explaining a change in the transition object in an electronic device according to various embodiments of the present disclosure.
Figure 9B:
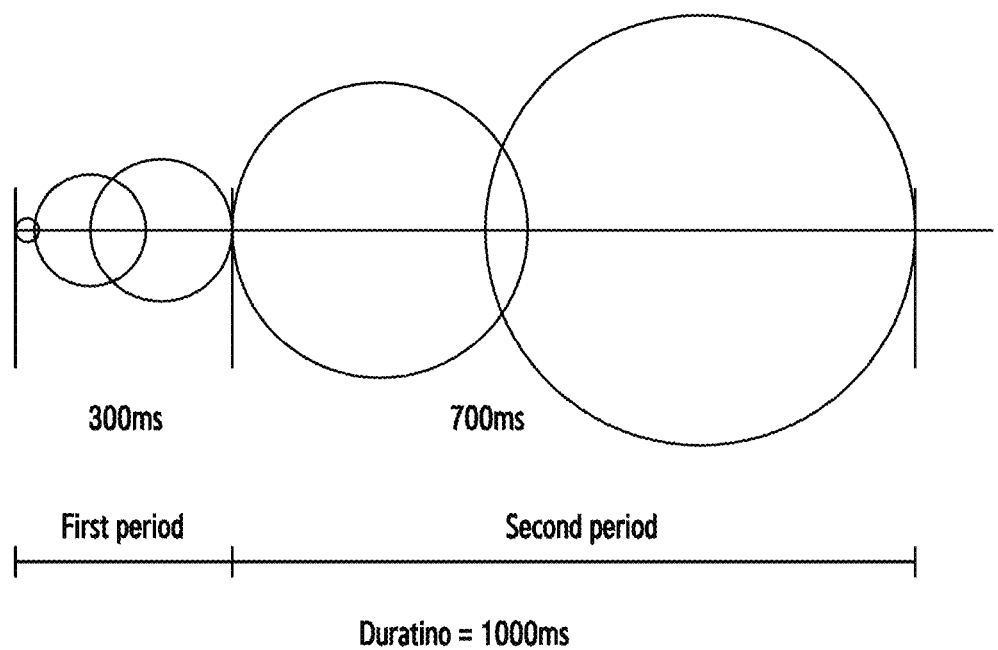

FIGS. 9A and 9B illustrate examples for explaining a change in the transition object in an electronic device according to various embodiments of the present disclosure.

FIG. 9A provides a non-limiting example of a change in the size of a transition object in the case of a small object as the example described above in FIG. 8A, and FIG. 9B shows a change in the size of a transition object in the case of a big object as the example described above in FIG. 8B. FIGS. 9A and 9B illustrate examples in the case where the duration, which refers to a setting time from the start of the display of contents to the completion of the display thereof, is 1 second (e.g., duration=1000 ms). In FIGS. 9A and 9B, the duration may be divided into a first period (for example, a period of 300 ms) and a second period (for example, a period of 700 ms) for the convenience of explanation. Although FIGS. 9A and 9B illustrate examples in which the transition object is provided in a circular shape and the circle (transition object) is expanded from the inside (e.g., a feature point portion) to the outside as the circle-up method, the various embodiments are not limited thereto.

Referring to FIGS. 9A and 9B, a change of the transition object may be processed at different speeds and accelerations (e.g., easing values) depending on the size of an object during the same duration. For example, as shown in FIGS. 9A and 9B, the size and the degree of jumping (for example, the degree of change or an acceleration of change) of the transition object may differ depending on the size of an object in the first period and the second period. According to at least one embodiment, the electronic device may allow the slide (the transition object) to pass a little faster when the recognized face is large, and may allow the slide (the transition object) to pass slowly when the recognized face is small.

Although the various embodiments show that the duration, for which the respective scenes (e.g., the respective contents) are switched, is fixed, the present disclosure is not limited thereto. According to various embodiments, the screen transition may be provided through a speed change according to the duration, which may be shortened or prolonged depending on various attributes of an object positioned at the feature point of the next contents.

Figure 10:
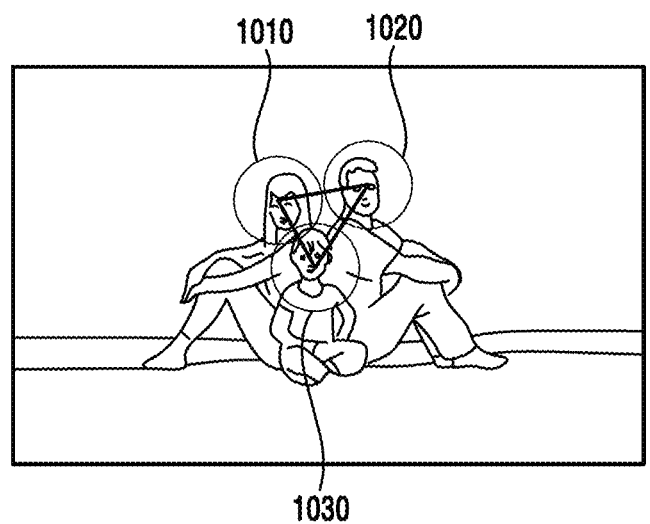
FIG. 10 is a view illustrating an example of providing a screen transition in an electronic device according to various embodiments of the present disclosure.

FIG. 10 illustrates an example of providing a screen transition in an electronic device according to various embodiments of the present disclosure.

FIG. 10 shows a non-limiting example in which the electronic device processes a plurality of objects recognized from the next contents (e.g., contents to be subsequently displayed according to the screen transition) as a single object, thereby providing a screen transition effect.

As shown in FIG. 10, when a plurality of objects (e.g., faces 1010, 1020, and 1030) are positioned at a feature point, the sizes of the plurality of objects (e.g., faces 1010, 1020, and 1030) may be distinguished and adjacent objects (e.g., faces 1010, 1020, and 1030) having similar sizes may be associated with each other to be processed as a single object. According to certain embodiments, when three faces 1010, 1020, and 1030, which are adjacent to each other and have similar sizes, are recognized, the three faces 1010, 1020 and 1030 may be processed as a single object. According to an embodiment, the electronic device may set the transition object to have a size containing the three faces 1010, 1020, and 1030 based on the process of the three faces 1010, 1020, and 1030 as a single object.

Figure 11:
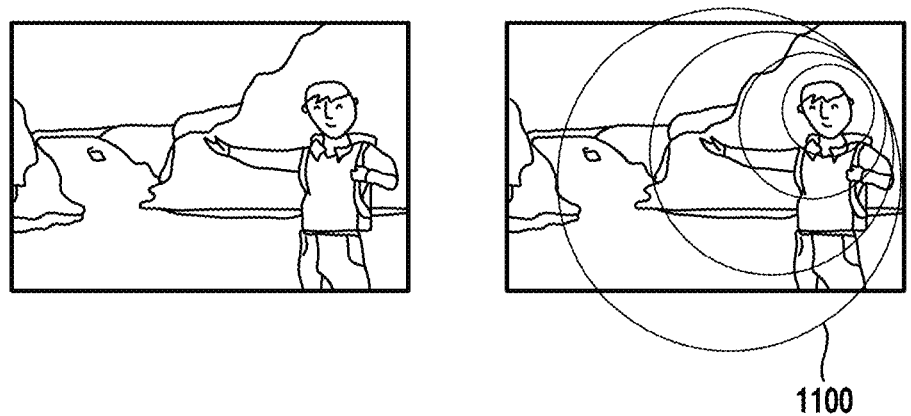
FIGS. 11, 12, and 13 are views illustrating examples of providing a screen transition in an electronic device according to various embodiments of the present disclosure.
Figure 12:
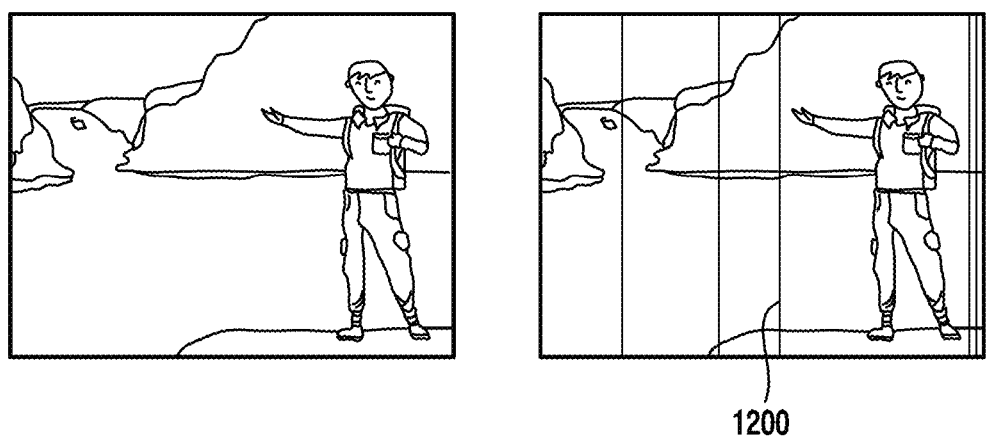
Figure 13:
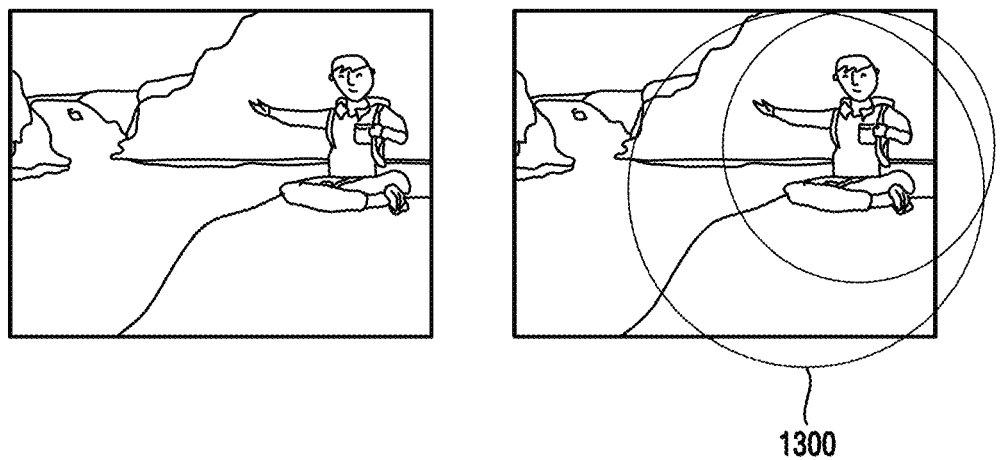

FIGS. 11, 12, and 13 illustrate examples of providing a screen transition in an electronic device according to various embodiments of the present disclosure.

FIGS. 11, 12, and 13 provide non-limiting examples in which the electronic device provides different screen transition effects depending on the position and/or the shape of a feature point (or an object) recognized from the next contents (e.g., contents to be subsequently displayed according to the screen transition). FIGS. 11, 12, and 13 provide examples, according to certain embodiments of this disclosure, in which the electronic device recognizes a plurality of attributes (conditions) and applies an optimal transition effect according to a plurality of attributes.

Referring to FIGS. 11, 12, and 13, the electronic device may recognize a feature point {for example, a face of a person, the upper body of a person, the whole body of a person (in the case of a standing person or a sitting person), a background (e.g., a natural image), or things} from the contents (e.g., contents to be subsequently displayed according to the screen transition), and may determine the size proportion (%) and the position (e.g., a position coordinate value) of the feature point in the contents. If it is determined that a plurality of attributes are combined based on the attribute analysis, the electronic device may set an optimal transition effect based on the combination of attributes. The electronic device may recognize an object of the feature point, and may set a transition object 1100 to have a circular, rectangular, triangular, polygonal, or oval shape depending on the shape of the object positioned at the feature point.

As shown in FIG. 11, the electronic device may, according to some embodiments, recognize the face and upper body part of a person positioned at the feature point in the contents. The electronic device may determine the size proportion (%) and the position of the feature point in the contents. Based on the recognized attributes, such as the face, the upper body part, the size, and the position, the electronic device may determine the shape of the corresponding transition object 1100 (e.g., a circle corresponding to the face), a start position of the transition object 1100 {e.g., the region (coordinates) where the face is positioned}, the moving direction of the transition object 1100 (e.g., in the lower left direction from the start position), and a changing speed of the transition object 1100 (e.g., Acceleration 1). The electronic device may display the contents by applying an optimal transition effect based on the determination. For example, the electronic device may perform the screen transition based on a circle effect by means of the circular transition object 1100 around a person.

As shown in FIG. 12, the electronic device may, in some embodiments, recognize the whole body of a person (including the upper and lower body parts for the person who is standing) positioned at the feature point from the contents. The electronic device may determine the size proportion (%) and the position of the feature point in the contents. Based on the recognized attributes, such as the person, the size, and the position, the electronic device may determine the shape of a corresponding transition object 1200 (e.g., a rectangular panorama corresponding to the whole body of the person), a start position of the transition object 1200 (e.g., the entire region where the person is positioned), the moving direction of the transition object 1200 (e.g., to the left from the start position), and a changing speed of the transition object 1200 (e.g., Acceleration 2). The electronic device may display the contents by applying an optimal transition effect based on the determination. For example, the electronic device may perform the screen transition based on a panorama effect by means of the rectangular transition object 1200 around a person.

As shown in the non-limiting example of FIG. 13, the electronic device may recognize the whole body of a person (including the upper and lower body parts of the person who is sitting) positioned at the feature point from the contents. The electronic device may determine the size proportion (%) and the position of the feature point in the contents. Based on the recognized attributes, such as the person, the size, and the position, the electronic device may determine the shape of a corresponding transition object 1300 (e.g., a circle-up corresponding the whole body of the person), the start position of the transition object 1300 (e.g., the entire region where the person is positioned), the moving direction of the transition object 1300 (e.g., expanding outwards around the start position), and the changing speed of the transition object 1300 (e.g., Acceleration 3). The electronic device may display the contents by applying an optimum transition effect based on the determination. For example, the electronic device may perform the screen transition based on the circle-up effect by means of the circular transition object 1300 around the person.

Figure 14:
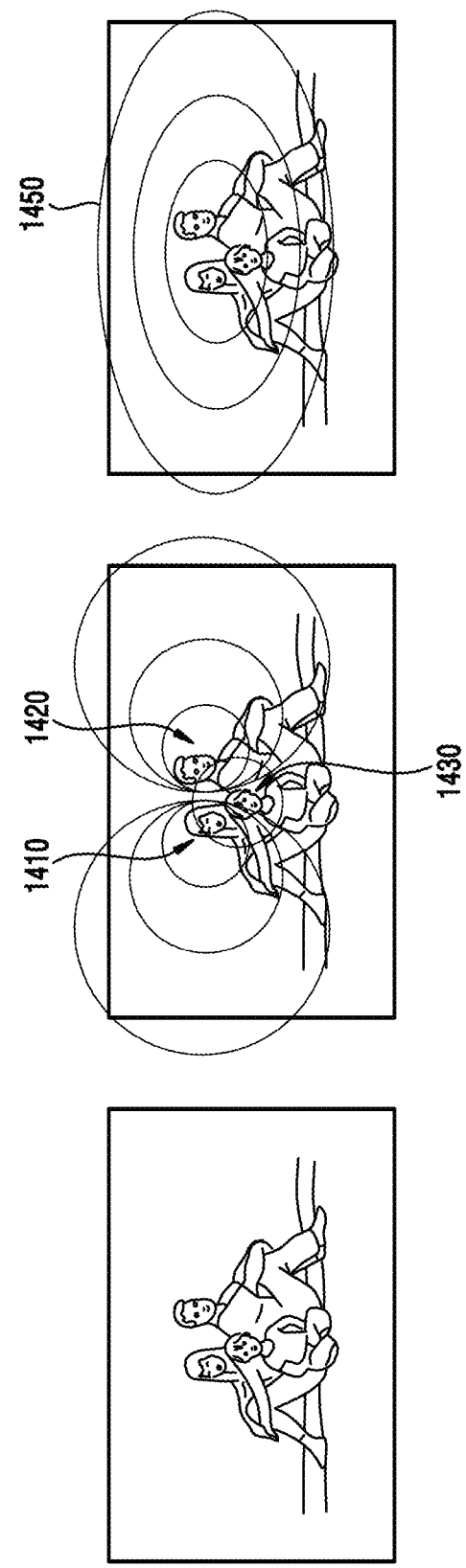
FIG. 14 is a view illustrating an example of providing a screen transition in an electronic device according to various embodiments of the present disclosure.

FIG. 14 illustrates an example of providing a screen transition in an electronic device according to various embodiments of the present disclosure.

FIG. 14 provides a non-limiting example of certain embodiments in which the electronic device provides different screen transition effects depending on the direction (e.g., the gaze direction of a person) of a feature point (or an object) recognized from the next contents (e.g., contents to be subsequently displayed according to the screen transition).

Referring to the non-limiting example of FIG. 14, the electronic device may recognize the feature point (e.g., the face of a person, the direction of a gaze according to the position of the eyes on the face, or the like) from the contents (e.g., contents to be subsequently displayed according to the screen transition), and may determine the size proportion (%) and the position of the feature point in the background image of the contents. If it is determined that a plurality of attributes are combined based on the attribute analysis, the electronic device may set an optimal transition effect based on the combination of attributes. The electronic device may recognize an object of the feature point, and may set a transition object to have a circular, rectangular, triangular, polygonal, or oval shape depending on the shape of the object positioned at the feature point.

According to at least one embodiment, such as shown in FIG. 14, the electronic device may recognize faces and gaze directions {for example, the first direction 1410 (e.g., left), the second direction 1420 (e.g., right), and the third direction 1430 (e.g., forward)) of persons positioned at the feature point from the contents. The electronic device may determine the size proportion (%) and the position of the feature point in the contents. Based on the recognized attributes, such as the faces, the directions, the sizes, or the positions, the electronic device may determine the shape of a corresponding transition object 1450 (e.g., an ellipse corresponding to the faces and the gaze directions), the start position of the transition object 1450 {for example, the region where the faces are positioned (three faces are processed as one object)}, the moving direction of the transition object 1450 (e.g., spreading left and right from the start position), and the changing speed of the transition object 1450 (e.g., acceleration).

According to certain embodiments, the electronic device may determine the first direction 1410, the second direction 1420, and the third direction 1430, and may determine the final transition object 1450 (e.g., an ellipse that spreads in the left and right directions) by analyzing the proportion (or density) corresponding to each direction (for example, left and right densities are high). The electronic device may display the contents by applying an optimum transition effect based on the determination. For example, the electronic device may perform the screen transition based on the circle effect by means of the oval transition object 1450 having the directivity around the person.

Figure 15:
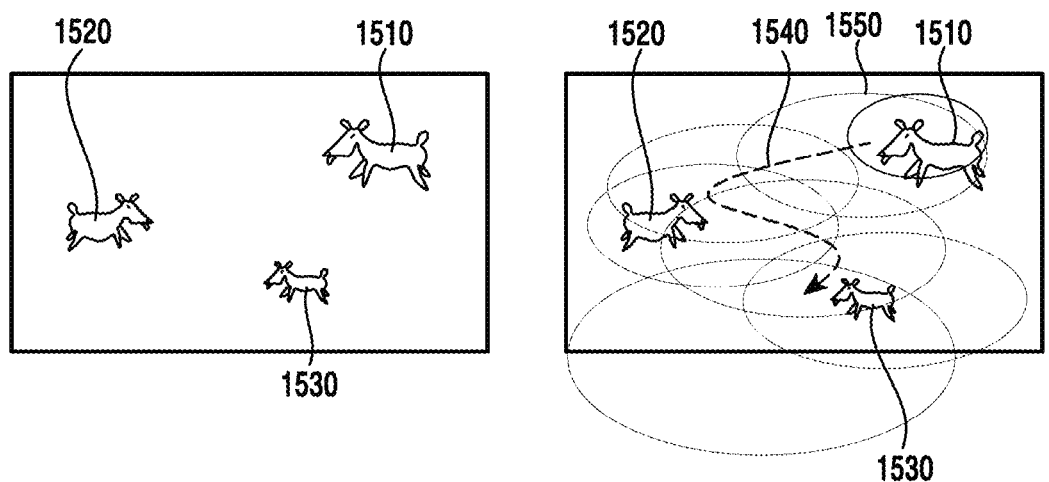
FIG. 15 is a view illustrating an example of providing a screen transition in an electronic device according to various embodiments of the present disclosure.

FIG. 15 illustrates an example of providing a screen transition in an electronic device according to various embodiments of the present disclosure.

FIG. 15 provides a non-limiting example of certain embodiments in which the electronic device provides different screen transition effects depending on the direction (e.g., the gaze direction) of a feature point (or an object) recognized from the next contents (e.g., contents to be subsequently displayed according to the screen transition).

Referring to FIG. 15, the electronic device may recognize a feature point {for example, the number of objects (e.g., animals), the gaze directions thereof, or the like} from the contents (e.g., contents to be subsequently displayed according to the screen transition), and may determine the size proportion (%) and the position (e.g., a plurality of positions corresponding to three objects) of the feature point in the background image of the contents. If it is determined that a plurality of attributes are combined based on the attribute analysis, the electronic device may set an optimal transition effect based on the combination of attributes. The electronic device may recognize an object of the feature point, and may set a transition object to have a circular, rectangular, triangular, polygonal, or oval shape depending on the shape of the object positioned at the feature point.

According to certain embodiments, such as shown in FIG. 15, the electronic device may recognize a plurality of objects 1510, 1520, and 1530 (e.g., animals) positioned at the feature point and the gaze directions of the respective objects 1510, 1520, and 1530 {for example, the first direction (e.g., left) of the first object 1510, the second direction (e.g., right) of the second object 1520, and the third direction (e.g., left) of the third object 1530} from the contents. The electronic device may determine the size proportion (%) and the position of the feature point in the contents. Based on the recognized attributes, such as the directions, the sizes, and the positions, the electronic device may determine the shape of a corresponding transition object 1550 (e.g., an ellipse corresponding to the gaze directions), a start position of the transition object 1550 {e.g., the regions where objects are positioned (the regions where three objects are positioned, respectively)}, the moving direction of the transition object 1550 (e.g., the moving direction of the transition object 1550 depending on the gaze directions of the objects 1510, 1520, and 1530), and the changing speed of the transition object 1550 (e.g., acceleration).

According to some embodiments, the electronic device may determine the first direction of the first object 1510, the second direction of the second object 1520, and the third direction of the third object 1530, and may determine a change in the transition object 1550 {e.g., a moving path 1540 (or a moving route) of the transition object 1550)}. The electronic device may display the contents by applying an optimal transition effect based on the determination. For example, the electronic device may perform the screen transition based on a direction conversion effect of moving the transition object 1550 in the first direction of the first object 1510 (for example, from the right to the left) from the position of the first object 1510, converting the moving direction of the transition object 1550 to the second direction of the second object 1520 (for example, from the left to the right) when the transition object 1550 reaches the position of the second object 1520, and converting the moving direction of the transition object 1550 to the third direction of the third object 1530 (for example, from the right to the left) when the transition object 1550 reaches the position of the third object 1530. According to some embodiments, the electronic device may move the transition object 1550 along the moving path denoted by a reference numeral 1540, and may provide a change in the size and/or the acceleration of the transition object 1550 depending on the movement.

Figure 16:
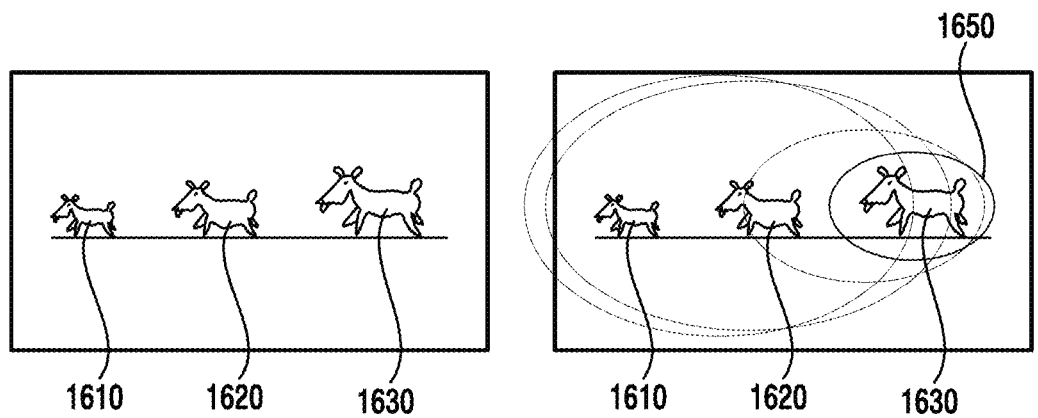
FIG. 16 is a view illustrating an example of providing a screen transition in an electronic device according to various embodiments of the present disclosure.

FIG. 16 illustrates an example of providing a screen transition in an electronic device according to various embodiments of the present disclosure.

FIG. 16 illustrates a non-limiting example of certain embodiments in which the electronic device provides different screen transition effects depending on the size of a feature point (or an object) (e.g., the sizes of a plurality of objects) recognized from the next contents (e.g., contents to be subsequently displayed according to the screen transition).

Referring to FIG. 16, the electronic device may recognize a feature point (for example, the sizes and the number of objects) from the contents (e.g., contents to be subsequently displayed according to the screen transition). The electronic device may set an optimal transition effect based on the attribute analysis. The electronic device may recognize an object of the feature point, and may set a transition object to have a circular, rectangular, triangular, polygonal, or oval shape depending on the shape of the object positioned at the feature point.

According to certain embodiments, such as shown in FIG. 16, the electronic device may recognize a plurality of objects 1610, 1620, and 1630 positioned at the feature point and the sizes of the respective objects 1610, 1620, and 1630 from the contents. Based on the recognized attributes, such as the number, the sizes, and the like, the electronic device may determine the shape of a corresponding transition object 1650 (e.g., an ellipse), a start position of the transition object 1650 (e.g., the largest object or the smallest object), the moving direction of the transition object 1650 {for example, moving from the start position (e.g., the largest object) to the small object or moving from the start position (e.g., the smallest object) to the large object}, and the changing speed of the transition object 1650 (e.g., acceleration).

According to some embodiments, the electronic device may set the transition object 1650 to have directivity of moving from the large object to the small object. For example, the electronic device may configure such that the transition object 1650 moves from the largest object (e.g., the third object 1630) to the smallest object (e.g., the first object 1610) in the contents. For example, the electronic device may perform the screen transition based on an ellipse effect having the directivity according to the size of an object.

Figure 17:
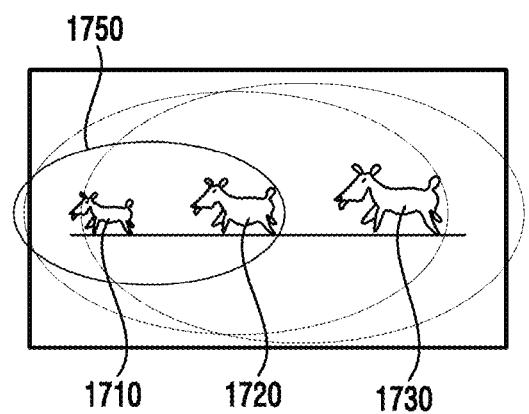
FIG. 17 is a view illustrating an example of providing a screen transition in an electronic device according to various embodiments of the present disclosure.

FIG. 17 illustrates an example of providing a screen transition in an electronic device according to various embodiments of the present disclosure.

FIG. 17 shows a non-limiting example of certain embodiments in which the electronic device provides different screen transition effects depending on the sharpness of a feature point (or an object) (e.g., the sharpness of each of the plurality of objects) recognized from the next contents (e.g., contents to be subsequently displayed according to the screen transition).

Referring to FIG. 17, the electronic device may recognize a feature point (for example, the sizes and the number of objects) from the contents (e.g., contents to be subsequently displayed according to the screen transition). The electronic device may set an optimal transition effect based on the attribute analysis. The electronic device may recognize an object of the feature point, and may set a transition object to have a circular, rectangular, triangular, polygonal, or oval shape depending on the shape of the object positioned at the feature point.

According to some embodiments, such as shown in FIG. 17, the electronic device may recognize a plurality of objects 1710, 1720, and 1730 positioned at the feature point and the sharpness of the respective objects 1710, 1720, and 1730 from the contents. Based on the recognized attributes, such as the number, the sharpness, and the like, the electronic device may determine the shape of a corresponding transition object 1750 (e.g., an ellipse), a start position of the transition object 1750 (e.g., a high-sharpness object or a low-sharpness object), the moving direction of the transition object 1750 (for example, moving from the start position to a low-sharpness object or moving from the start position to a high-sharpness object), and the changing speed of the transition object 1750 (e.g., acceleration).

According to at least one embodiment, the electronic device may set the transition object 1750 to have directivity of moving from the high-sharpness object to the low-sharpness object. For example, the electronic device may configure such that the transition object 1750 moves (or spreads) from an object having the highest sharpness (e.g., the first object 1710) to an object having the lowest sharpness (e.g., the third object 1730) in the contents. For example, the electronic device may perform the screen transition based on an ellipse effect having the directivity according to the sharpness of an object.

Figure 18:
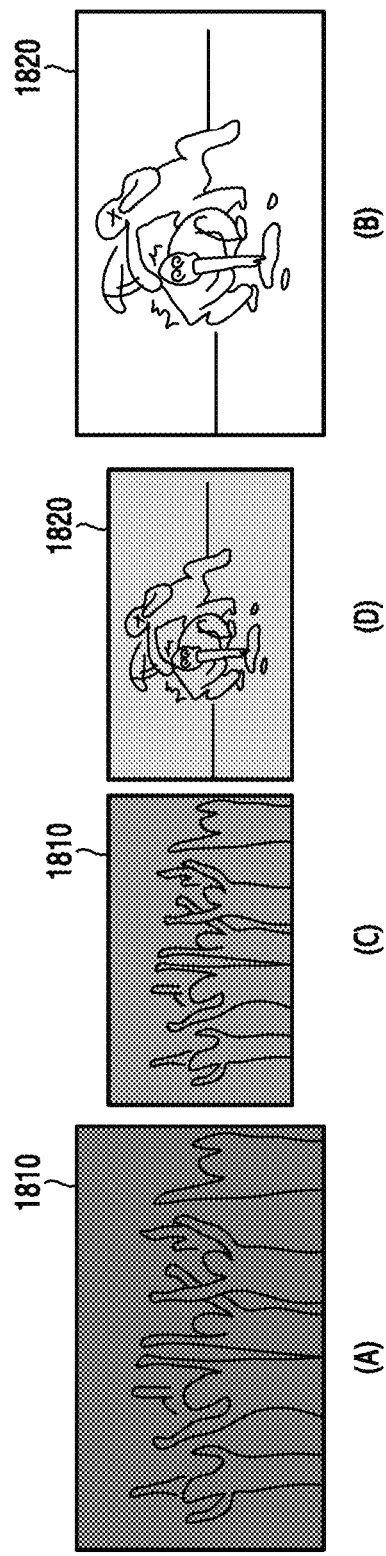
FIG. 18 is a view illustrating an example of providing a screen transition in an electronic device according to various embodiments of the present disclosure.

FIG. 18 illustrates an example of providing a screen transition in an electronic device according to various embodiments of the present disclosure.

FIG. 18 provides a non-limiting example of certain embodiments wherein the electronic device provides different screen transition effects depending on the brightness difference between the current contents (e.g., contents being displayed before the screen transition) and the next contents (e.g., contents to be subsequently displayed according to the screen transition).

Referring to FIG. 18, a screen example (A) may show an example in which the first contents 1810 (e.g., the current contents) are displayed at a first brightness (e.g., at a low brightness), and a screen example (B) may show an example in which the second contents 1820 (e.g., the next contents following the first contents, which is to be subsequently displayed according to the screen transition) are displayed at a second brightness (e.g., at a high brightness).

According to various embodiments, the electronic device may determine the brightness difference between the two consecutive contents (e.g., images) when the screen switches. For example, the electronic device may extract a color region of the first contents 1810 and a color region of the second contents 1820, and may compare the same with each other. If there is a big difference between the color regions of the first contents 1810 and the second contents 1820 (for example, if there is a significant difference between the first brightness and the second brightness), the electronic device may adjust the brightness of the second contents 1820, or may correct the colors of the second contents 1820.

According to certain embodiments, such as shown in the screen examples (A) and (B) in FIG. 18, the first contents 1810 may be dark images having the first brightness, and the second contents 1820 may be bright images having the second brightness. If there is a big difference in the brightness between the two consecutive contents (for example, the brightness difference is equal to or greater than a predetermined reference value), when the screen switches, the electronic device may adjust the brightness of at least one of the first contents 1810 and/or the second contents 1820, or may correct the colors thereof when switching the screen, thereby preventing the glare. This example is shown in screen examples (C) and (D) of FIG. 18. The screen example (C) provides a non-limiting example in which the brightness of the first contents 1810 has been adjusted to be relatively high, and the screen example (D) provides a non-limiting example in which the brightness of the second contents 1820 has been adjusted to be relatively low.

According to certain embodiments, if currently displayed contents (e.g. the first contents 1810) are very dark and next contents to be displayed subsequent thereto (e.g., the second contents 1820) are bright, the electronic device, when switching the screen, may correct (adjust) the brightness or colors of at least one of them, thereby providing a smooth transition between the contents and preventing the glare of a user.

Figure 19A:
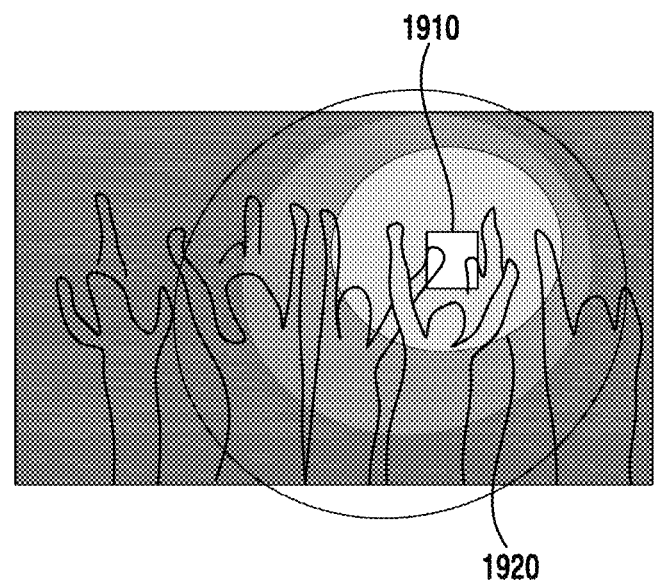
FIGS. 19A, 19B, and 19C are views illustrating examples of providing a screen transition in an electronic device according to various embodiments of the present disclosure.
Figure 19B:
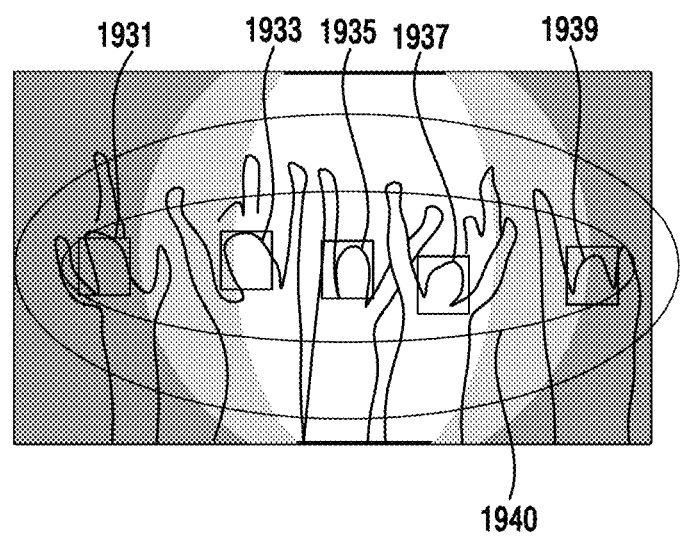
Figure 19C:
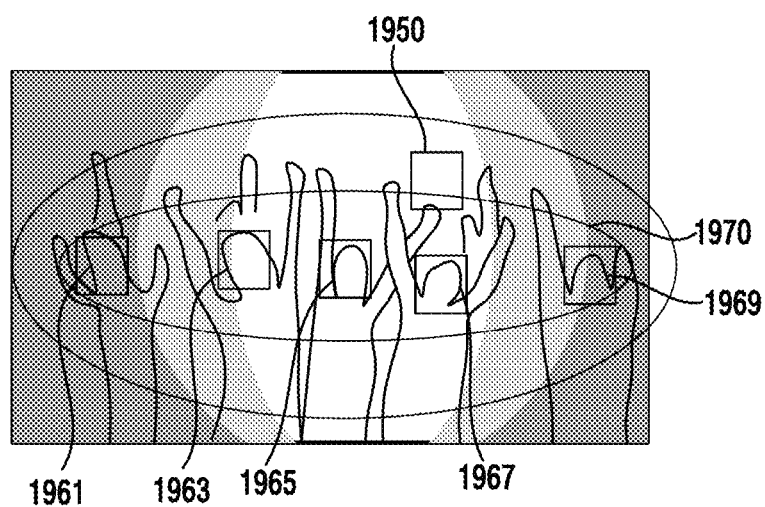

FIGS. 19A, 19B, and 19C illustrate examples of providing a screen transition in an electronic device according to various embodiments of the present disclosure.

FIGS. 19A, 19B, and 19C provide non-limiting examples of certain embodiments in which the electronic device provides different screen transition effects depending on the brightness (e.g., the entire brightness or partial brightness of the contents) of a feature point (or an object) recognized in the next contents (e.g., the contents to be subsequently displayed according to the screen transition).

Referring to FIG. 19A, the electronic device may recognize a feature point (e.g., a region, a face, object, or things having a high brightness) in the contents (e.g., the contents to be subsequently displayed according to the screen transition). FIG. 19A shows an example in which the electronic device recognizes the brightness as a feature point. Based on the recognized brightness attribute, the electronic device may determine the shape of a corresponding transition object 1920 (e.g., a circle), a start position of the transition object 1920 (e.g., the region having a high brightness), the moving direction of the transition object 1920 (e.g., moving from the start position to a low-brightness region), and the changing speed of the transition object 1920 (e.g., acceleration). According to some embodiments, the electronic device may set the transition object 1920 to have directivity of moving from a high-brightness region to a low-brightness region. For example, the electronic device be configured such that a circular transition object 1920 is generated in the region 1910 of a highest brightness and expands (or spreads) outwards in the contents. For example, the electronic device may perform the screen transition based on a circle effect around the high-brightness region of the contents.

Referring to FIG. 19B, the electronic device may recognize a feature point (e.g., a bright region, face, or things) in the contents (e.g., contents to be subsequently displayed according to the screen transition). FIG. 19B provides a non-limiting example of embodiments in which the electronic device recognizes a plurality of objects 1931, 1933, 1935, 1937, and 1939 (e.g., faces) and brightness as a feature point. Even if the electronic device recognizes a high-brightness region, the electronic device, based on the recognized objects 1931, 1933, 1935, 1937, and 1939, may determine the shape of a corresponding transition object 1940 (e.g., an ellipse), a start position of the transition object 1940 (e.g., a position containing all of the plurality of objects 1931, 1933, 1935, 1937, and 1939), the size of the transition object 1940 (e.g., the size containing all of the plurality of objects 1931, 1933, 1935, 1937, and 1939), and the changing speed of the transition object 1940 (e.g., acceleration). According to an embodiment, the electronic device may set the oval transition object 1940 to have directivity of moving outwards around the objects 1931, 1933, 1935, 1937 and 1939. For example, the electronic device may be configured such that the oval transition object 1940 is generated and expands (or spreads) outwards. For example, the electronic device may perform the screen transition based on an ellipse effect around the objects 1931, 1933, 1935, 1937 and 1939 of the contents.

Referring to FIG. 19C, the electronic device may, according to certain embodiments, recognize a feature point (e.g., a bright region, face, or things) in the contents (e.g., the contents to be subsequently displayed according to the screen transition). FIG. 19C provides a non-limiting example of certain embodiments in which the electronic device recognizes, as a feature point, a bright region 1950 and a plurality of objects 1961, 1963, 1965, 1967, and 1969 (e.g., faces). The electronic device, based on all of the bright region 1950 and the objects 1961, 1963, 1965, 1967, and 1969, may determine the shape of a corresponding transition object 1970 (e.g., an ellipse), a start position of the transition object 1970 (e.g., a position containing all of the plurality of objects 1961, 1963, 1965, 1967, and 1969 and the bright region 1950), the size of the transition object 1970 (e.g., a size containing all of the plurality of objects 1961, 1963, 1965, 1967, and 1969 and the bright region 1950), and the changing speed of the transition object 1970 (e.g., acceleration). According to some embodiments, the electronic device may set the oval transition object 1970 to have directivity of moving outwards around the objects 1961, 1963, 1965, 1967, and 1969 and the bright region 1950. For example, the electronic device may configure such that the oval transition object 1970 is generated and expands (or spreads) outwards. For example, the electronic device may perform the screen transition based on an ellipse effect around the objects 1961, 1963, 1965, 1967, and 1969 and the bright region 1950 of the contents.

Figure 20:
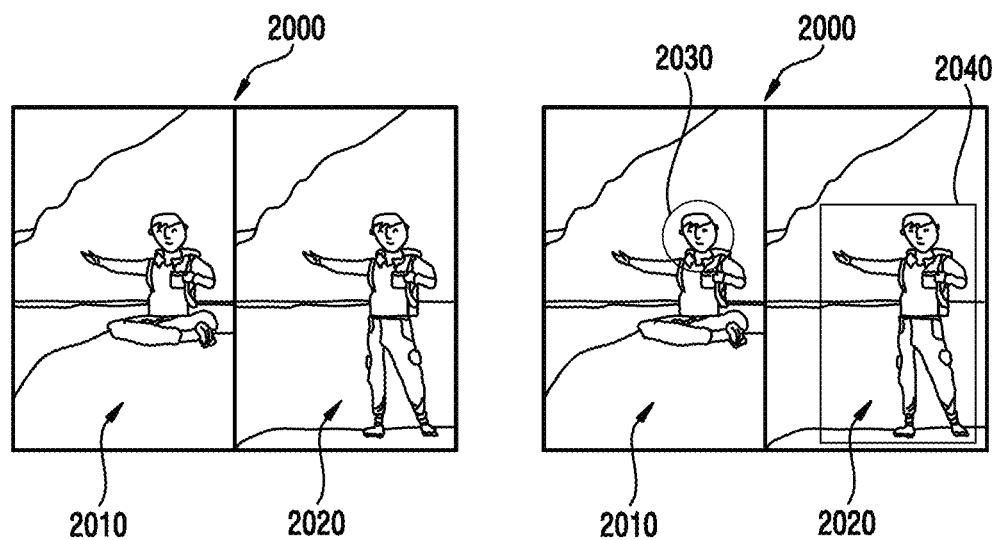
FIG. 20 is a view illustrating an example of providing a screen transition in an electronic device according to various embodiments of the present disclosure.

FIG. 20 illustrates an example of a screen transition in an electronic device according to various embodiments of the present disclosure. FIG. 20 illustrates an example of certain embodiments in which the first image 2010 and the second image 2020 are configured as a single content by editing images (for example, synthesis at least two different images) for the contents 2000 (e.g., contents to be subsequently displayed according to the screen transition) or an example in which there are a plurality of feature points spaced apart from each other in the contents 2000. A description will be made of an example in which different images, such as the first image 2010 and the second image 2020, are combined to a single content 2000 with reference to FIG. 20.

Referring to FIG. 20, the electronic device may recognize a feature point (e.g., the sizes, number, or positions of objects) in the content 2000 (e.g., the content to be subsequently displayed according to the screen transition). The electronic device may set an optimal transition effect based on the attribute analysis. According to various embodiments, the electronic device may set independent transition effects to the plurality of feature points, respectively. For example, the electronic device may provide screen transition effects by operating a plurality of transition effects, which are the same or different from each other, in the content 2000.

According to certain embodiments, such as shown in FIG. 20, the electronic device may set a transition effect by means of the first transition object 2030 based on the attribute analysis of the first feature point in the first image 2010 of the content 2000, and may set a transition effect by means of the second transition object 2040 based on the attribute analysis of the second feature point in the second image 2020 thereof. For example, the electronic device may set a circle effect with a first color and a first speed to the first circular transition object 2030 around the first feature point (e.g., a first person) in the first image 2010, and may set a panorama effect with a second color and a second speed to the second rectangular transition object 2040 around the second feature point (e.g., a second person) in the second image 2020, thereby performing the screen transition based on the respective objects.

Figure 21:
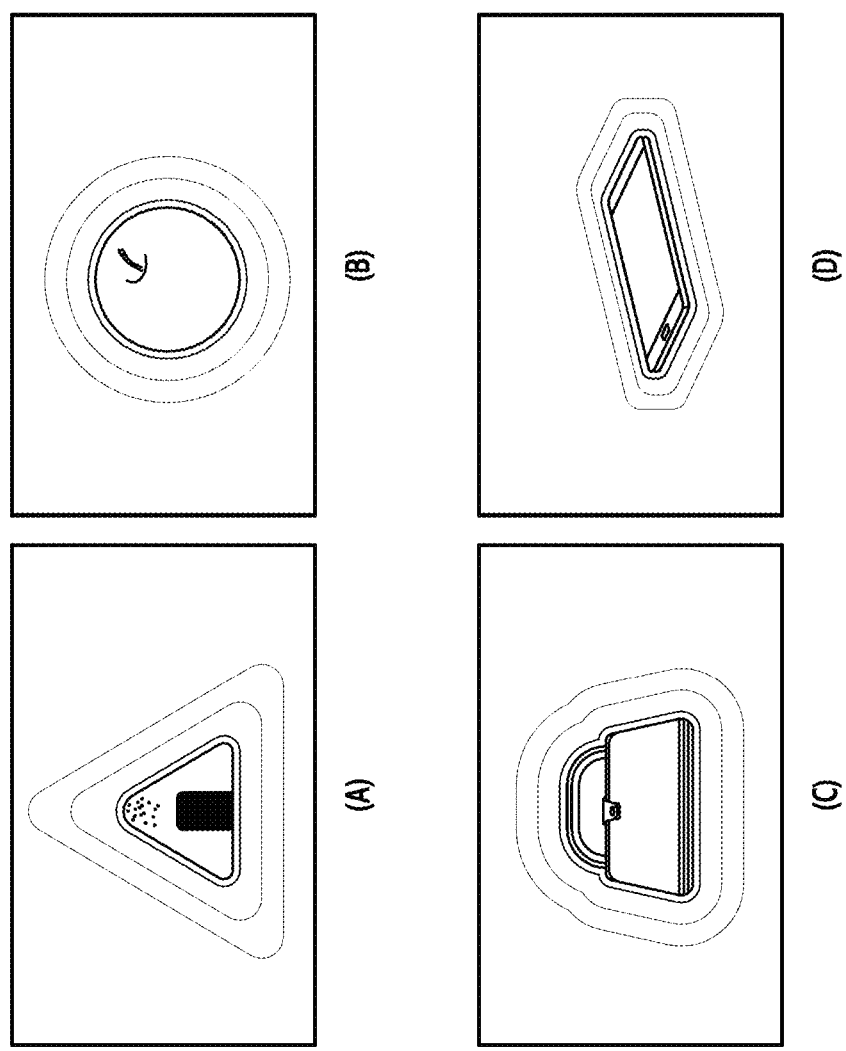
FIG. 21 is a view illustrating an example for explaining the determination of a shape of a transition object in an electronic device according to various embodiments of the present disclosure.

FIG. 21 is a view illustrating an example for explaining the determination of a shape of a transition object in an electronic device according to various embodiments of the present disclosure.

FIG. 21 provides non-limiting examples of embodiments wherein the electronic device provides different screen transition effects depending on the shape of a feature point (or an object) recognized in the next contents (e.g., contents to be subsequently displayed according to the screen transition). For example, the electronic device may recognize the shape of an object positioned at the feature point in the contents, and may set the shape of a transition object corresponding to the recognized shape. In various embodiments, the electronic device may generate a transition object to have a size corresponding to the size of the object when setting the shape of the transition object. For example, the electronic device may generate the transition object to correspond to the shape and size of the object.

According to certain embodiments, such as shown in screen example (A) of FIG. 21, the electronic device may recognize a first shape (e.g., a triangle) of an object, and may configure the shape of the transition object (e.g., a triangle) in the first shape to correspond to the first shape, thereby process the screen transition based on the configured transition object.

According to some embodiments, such as shown in screen example (B) of FIG. 21, the electronic device may recognize a second shape (e.g., a circle) of an object, and may configure the shape of the transition object (e.g., a circle) in the second shape to correspond to the second shape, thereby process the screen transition based on the configured transition object.

According to certain embodiments, such as shown in screen example (C) of FIG. 21, the electronic device may recognize a third shape (e.g., a polygon) of an object, and may configure the shape of the transition object (e.g., a polygon) in the third shape to correspond to the third shape, thereby process the screen transition based on the configured transition object.

According to certain embodiments, such as shown in screen example (D) of FIG. 21, the electronic device may recognize a fourth shape (e.g., a rectangle) of an object, and may configure the shape of the transition object (e.g., a rectangle) in the fourth shape to correspond to the fourth shape, thereby process the screen transition based on the configured transition object.

Figure 22:
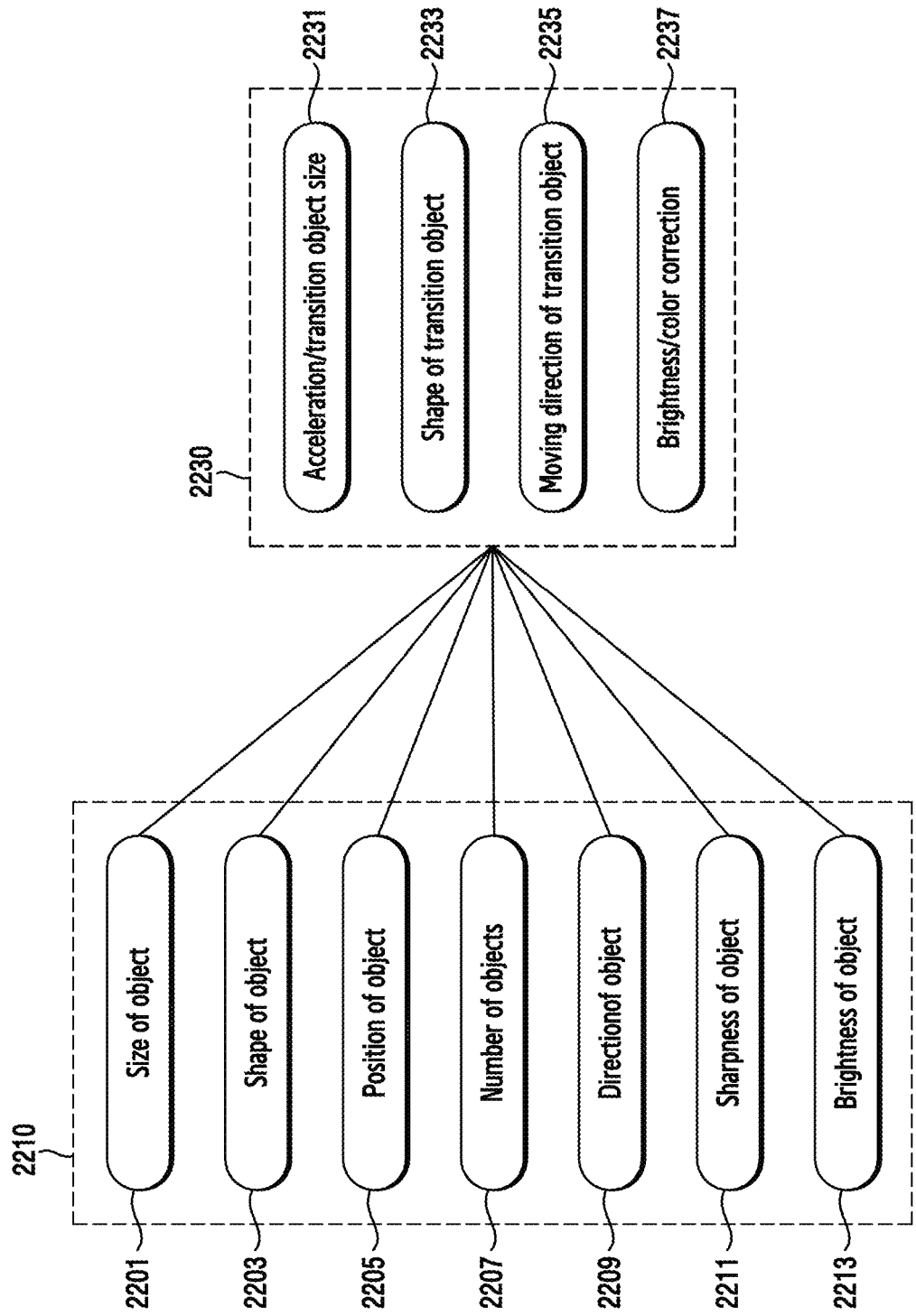
FIG. 22 is a view illustrating an example for explaining the determination of a transition effect based on a feature point in an electronic device according to various embodiments of the present disclosure.

FIG. 22 is a view illustrating an example for explaining the determination of a transition effect based on a feature point in an electronic device according to various embodiments of the present disclosure.

As shown in FIG. 22, in various embodiments, it is possible to distinguish between various attributes 2210 of a feature point or an object positioned at the feature point of the contents and to determine a transition effect 2230 based on, at least in part, the various attributes 2210.

In various embodiments, the attributes 2210, for example, may include the size 2201, the shape 2203, the position 2205, the number 2207, the direction 2209, the sharpness 2211, or the brightness 2213 of the object(s), but the present disclosure is not limited thereto. In various embodiments, the transition effects 2230, for example, may be determined by considering, at least in part, the acceleration (or the amount of change) of a transition object, the size of a transition object, the shape of a transition object, the moving direction of a transition object, brightness/color correction of a transition object or contents, and the like.

According to various embodiments, the electronic device may analyze all or at least some of the attributes 2210 in sequence or parallel, and may set the transition effect based on one or more analyzed attributes.

According to an embodiment, the electronic device may determine the acceleration and/or the size of a transition object 2231 based on the size of an object 2201 and/or the number of objects 2207. According to an embodiment, the electronic device may determine the shape of a transition object 2233 based on the shape of an object 2203 and/or the number of objects. According to an embodiment, the electronic device may determine the moving direction of a transition object 2235 based on the direction of an object 2209 (e.g., the gaze direction), the size of an object 2201, the position of an object 2205 and/or the sharpness of an object. According to an embodiment, the electronic device may determine the brightness/color correction of contents or a transition object 2237 based on the brightness of an object 2213 or the like.

As described above, an operating method of an electronic device, according to various embodiments, may include: displaying first contents; analyzing the attributes of second contents to be displayed subsequent to the first contents; determining a transition effect corresponding to the attributes of the second contents; and displaying the second contents based on the determined transition effect when a screen switches from the first contents to the second contents.

According to various embodiments, the determining of the transition effect may include: detecting a feature point of the second contents while displaying the first contents; and determining a transition effect corresponding to at least one of the attributes of an object positioned at the feature point.

According to various embodiments, the attributes may include the size, the number, the shape, the proportion, the sharpness, the brightness, the direction, or the position of the object(s) included in the feature point.

According to various embodiments, the feature point may include a region or an object that is a key feature in the contents, and the detecting of the feature point may include detecting the feature point based on, at least in part, object recognition, face recognition, screen analysis, text recognition, or a point of interest (POI) set in the contents.

According to various embodiments, the displaying of the second contents may include differently providing at least one of a transition speed, a transition color, or a transition form by a transition object based on the attributes of an object included in the feature point.

According to various embodiments, the displaying of the second contents may include providing the transition effect at different accelerations according to the attributes for a duration set for the screen transition.

According to various embodiments, the displaying of the second contents may include: providing a quick change in the transition object during the duration when the initial size of the transition object is small; and providing a slow change in the transition object during the duration when the initial size of the transition object is big.

According to various embodiments, the method may further include displaying the second contents by means of a screen transition according to a predetermined transition effect when no feature point is detected in the second contents.

According to various embodiments, the displaying of the second contents may include controlling the screen transition by gradually expanding a transition object around the feature point based on, at least in part, the attributes, such as a size, a shape, or a speed, such that the second contents gradually appear through the transition object.

According to various embodiments, the first contents and the second contents may include static contents or dynamic contents, which can be displayed through the display and can be used for the screen transition.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a display;
   a memory; and
   a processor configured to be operably coupled to the display and the memory, wherein the processor is configured to:
   display first content on the display;
   determine a feature area of second content to be displayed subsequently after the first content, wherein a size and a location of the feature area of the second content is determined to cover at least one key object in the second content;
   analyze attributes of the feature area of the second content;
   determine a transition effect corresponding to the attributes of the feature area of the second content; and
   display the second content from the feature area of the second content within a geometric shape in an initial size at a location over the first content and gradually expand the geometric shape to show the second content until the second content is fully unveiled, based on the determined transition effect when a screen switches from the first content to the second content,
   wherein the initial size and the location of the geometric shape for displaying the feature area of the second content are determined based on the size and the location of the feature area.

2. The electronic device of claim 1, wherein the processor is configured to:
   detect the feature area of the second content while displaying the first content; and
   determine the transition effect corresponding to at least one attribute of an object positioned at the feature area.

3. The electronic device of claim 2, wherein the attribute of the object positioned at the feature area includes a size, a number, a shape, a proportion, a sharpness, a brightness, a direction, or a position of the object included in the feature area.

4. The electronic device of claim 2, wherein the feature area comprises a region or an object that is a key feature in the second content, and
   wherein the processor is configured to detect the feature area based on, at least in part, object recognition, face recognition, screen analysis, text recognition, or a point of interest (POI) set in the second content.

5. The electronic device of claim 2, wherein the processor is configured to differently provide at least one of a transition speed, a transition color, or a transition form by a transition object based on the attribute of the object included in the feature area.

6. The electronic device of claim 2, wherein the processor is configured to provide the transition effect at one of different accelerations according to attributes of a duration for a screen transition.

7. The electronic device of claim 6, wherein the processor is configured to control a change speed of a transition object during the duration based on an initial size of the transition object.

8. The electronic device of claim 2, wherein the processor is configured to display the second content by means of a screen transition according to a predetermined transition effect when no feature area is detected in the second content.

9. The electronic device of claim 2, wherein the processor is configured to control a screen transition by gradually expanding a transition object around the feature area based on, at least in part, at least one of a size, a shape, or a speed of the second content, such that the second content gradually appears through the transition object.

10. The electronic device of claim 1, wherein the first content and the second content include at least one of static content or dynamic content, which can be displayed through the display and can be used for a screen transition.

11. An operating method of an electronic device, the method comprising:

displaying first content on a display;

determining a feature area of second content to be displayed subsequently after the first content, wherein a size and a location of the feature area of the second content is determined to cover at least one key object in the second content;

analyzing attributes of the feature area of the second content to be displayed subsequent to the first content;

determining a transition effect corresponding to the attributes of the feature area of the second content; and displaying the second content from the feature area of the second content within a geometric shape in an initial size at a location over the first content and gradually expanding the geometric shape to show the second content until the second content is fully unveiled, based on the determined transition effect when a screen switches from the first content to the second content, wherein the initial size and the location of the geometric shape for displaying the feature area of the second content are determined based on the size and the location of the feature area.

12. The method of claim 11, wherein determining of the transition effect comprises:

detecting a feature area of the second content while displaying the first content; and determining a transition effect corresponding to an attribute of an object positioned at the feature area.

13. The method of claim 12, wherein the attribute of the object positioned at the feature area includes a size, a number, a shape, a proportion, a sharpness, a brightness, a direction, or a position of the object included in the feature area.

14. The method of claim 12, wherein the feature area comprises a region or an object that is a key feature in the second content, and wherein detecting of the feature area comprises detecting the feature area based on, at least in part, object recognition, face recognition, screen analysis, text recognition, or a point of interest (POI) set in the second content.

15. The method of claim 12, wherein displaying of the second content comprises providing at least one of a transition speed, a transition color, or a transition form by a transition object based on the attributes of an object included in the feature area.

16. The method of claim 12, wherein displaying of the second content comprises providing the transition effect at different accelerations according to the attributes for a duration for a screen transition.

17. The method of claim 16, wherein displaying of the second content comprises:

controlling a change speed of a transition object during the duration based on an initial size of the transition object.

18. The method of claim 12, further comprising displaying the second content using a screen transition according to a predetermined transition effect when no feature area is detected in the second content.

19. The method of claim 12, wherein displaying the second content comprises controlling a screen transition by gradually expanding a transition object around the feature area based on, at least in part, a size, a shape, or a speed of the second content, such that the second content gradually appears through the transition object.

20. The method of claim 11, wherein the first content and the second content include at least one of static content or dynamic content, which can be displayed through the display and can be used for a screen transition.

* * * * *